US012786076B2

(12) United States Patent
Muthukrishnan et al.

(10) Patent No.: US 12,786,076 B2
(45) Date of Patent: Nov. 3, 2026

(54) MANAGING DATA IN IoT SYSTEMS

(71) Applicant: Honeywell International Inc., Charlotte, NC (US)

(72) Inventors: Sharmila Muthukrishnan, Bangalore (IN); Kushal Ramesh, Bangalore (IN); Shubhanjali K, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 62 days.

(21) Appl. No.: 19/048,990

(22) Filed: Feb. 10, 2025

(65) Prior Publication Data

US 2026/0238566 A1 Aug. 13, 2026

(51) Int. Cl.
*H04L 41/18* (2022.01)
*H04L 41/0816* (2022.01)
*H04L 41/0823* (2022.01)

(52) U.S. Cl.
CPC .......... *H04L 41/18* (2013.01); *H04L 41/0816* (2013.01); *H04L 41/0823* (2013.01)

(58) Field of Classification Search
CPC . H04L 41/08; H04L 41/0813; H04L 41/0816; H04L 41/0823; H04L 41/18
See application file for complete search history.

(56) References Cited

U.S. PATENT DOCUMENTS 11,469,974 B1 * 10/2022 Cruise ................. G06F 11/3006
2017/0187597 A1 * 6/2017 Nolan ................... H04L 43/062
2019/0104437 A1 * 4/2019 Bartfai-Walcott ........................... H04L 41/0896
2019/0386924 A1 * 12/2019 Srinivasan ............ H04L 47/115
2021/0326294 A1 * 10/2021 Chen ................... G06F 13/4068
2022/0150212 A1 * 5/2022 Rajput .................. H04L 63/166
2026/0087158 A1 * 3/2026 Gupta ................... G06F 21/606

FOREIGN PATENT DOCUMENTS

BR 112018006469 B1 * 8/2024
WO WO-2024130088 A1 * 6/2024 ............ G06F 9/542

* cited by examiner

*Primary Examiner* — Boris D Grijalva Lobos
(74) *Attorney, Agent, or Firm* — Alston & Bird LLP

(57) ABSTRACT

Example techniques to manage data in IoT systems are described. In an example, telemetry data is received at a first event hub from a plurality of IoT devices. The rate of data receipt is monitored, and an IoT device generating data at a rate exceeding a predefined threshold is identified. Telemetry data from the identified IoT device is redirected to a second event hub configured to process high-throughput data. A throttling rate is determined for the data transmitting to one or more subscribed applications. The throttling rate is applied to ensure efficient delivery of telemetry data without overloading the event hubs and subscribed applications.

20 Claims, 10 Drawing Sheets

MANAGING DATA IN IoT SYSTEMS

BACKGROUND

The Internet of Things (IoT) has emerged as a transformative technology paradigm, enabling the interconnection of a vast array of devices and systems through network connectivity. This interconnected ecosystem allows for the collection, exchange, and analysis of data from diverse sources, ranging from industrial equipment to household appliances. As IoT systems continue to grow in scale and complexity, the volume of data generated by these connected devices has increased exponentially.

The sheer volume of data generated by IoT devices present significant challenges for data management and processing. Traditional data handling approaches may struggle to cope with the massive influx of information, potentially leading to bottlenecks, latency issues, and reduced system performance.

As IoT systems continue to expand across various sectors, including smart cities, industrial automation, healthcare, and consumer electronics, there has been a pressing demand for robust and efficient data management solutions. These solutions must not only handle the current scale of IoT data but also be capable of adapting to future growth and evolving requirements of IoT ecosystems.

SUMMARY

Various embodiments of systems, methods, and non-transitory computer-readable media for managing data in IoT systems are described herein.

The details of some embodiments of the invention described in this specification are set forth in the accompanying drawings and the description below. Other features, aspects, and advantages of the invention will become apparent from the description, the drawings, and the claims.

The present invention relates to methods, systems, and non-transitory computer-readable media for managing data in IoT systems.

In accordance with an example embodiment of the present subject matter, the system to manage data in IoT systems includes at least one processor configured to determine a rate of receipt of telemetry data at a first event hub. The first event hub is to receive the telemetry data from a plurality of IoT devices and provide the telemetry data to one or more applications subscribed to the telemetry data. Further, the processor identifies, based on the determination, an IoT device among the plurality of IoT device generating the telemetry data at a rate above the predefined threshold. The processor is further configured to direct the telemetry data of the identified IoT device to a second event hub. The second event hub is configured to process the telemetry data from the identified IoT device. The processor further determines a throttling rate for the second event hub to apply to the telemetry data from the identified IoT device. The throttling rate determines a rate of delivery of the telemetry data to the one or more applications. In accordance with example embodiments of the present subject matter, once the throttling rate has been determined for the identified IoT device, the processor may cause the second event hub to transmit the telemetry data to the one or more applications at the throttled rate.

According to another embodiment of the present subject matter, a method for managing data in IoT system. According to the method, an IoT device, amongst a plurality of IoT devices coupled to a first event hub, generating telemetry data at a rate above a predefined threshold, is identified. On identification, the identified IoT device is configured to direct the telemetry data to a second event hub. A throttling rate for the second event hub is determined to apply to the telemetry data from the identified IoT device. The throttling rate determines the rate of delivery of the telemetry data to one or more applications subscribed to the telemetry data from the identified IoT device. The throttle rate is provided to the second event hub to cause the second event hub to transmit the telemetry data from the identified IoT device to the one or more applications at the throttling rate. An alert is generated to cause resolution of issues resulting in the identified IoT device generating the telemetry data at the rate above the predefined threshold.

According to yet another embodiment of the present subject matter, a non-transitory computer readable medium comprising instructions executable by a processing resource to manage data in IoT system is provided. The instructions, when executed, cause the processing resource to monitor telemetry data reception at each of a plurality of partitions of a first event hub. Each of the partitions is coupled to one or more IoT devices to receive telemetry data from the respective IoT devices. The instructions may further cause the processing resource to determine a rate of data reception at at least one partition of the plurality of partitions to be above a predefined threshold. The instructions may further cause the processing resource to identify, from amongst the one or more IoT devices coupled to the at least one partition, an IoT device to cause the rate of data reception to be above the predefined threshold. The instructions may further cause the processing resource to configure the identified IoT device to direct the telemetry data to a second event hub. The instructions also cause the processing resource to instruct the second event hub to transmit the telemetry data from the identified IoT device to one or more applications at a throttling rate to cause a rate of data reception of the telemetry data, from the identified IoT device, at the one or more applications to be lower than the predefined threshold.

In accordance with example implementation of the present subject matter, the techniques for managing data in IoT system described herein provide for improved efficiency and reliability in handling large volumes of telemetry data from IoT devices. The present technique allows dynamically identify IoT devices generating excessive data, redirect their data streams to dedicated event hubs, and apply throttling mechanisms to regulate data flow. This approach may help prevent overload scenarios, ensure consistent performance of subscribed applications, and maintain the overall stability of the IoT ecosystem. Additionally, the techniques also allow to isolate and manage problematic devices without disrupting the entire IoT network, thereby enhancing the scalability and fault tolerance of IoT deployments.

Additional features and advantages are realized through the concepts of the present invention. Other embodiments and aspects of the invention are described in detail herein and are considered a part of the claimed invention.

BRIEF DESCRIPTION OF FIGURES

The following detailed description references the drawings, wherein.

In the figures, the left-most digit(s) of a reference number identifies the figure in which the reference number first appears. The same numbers are used throughout the drawings to reference like features and components.

DETAILED DESCRIPTION OF FIGURES

Figure 1:
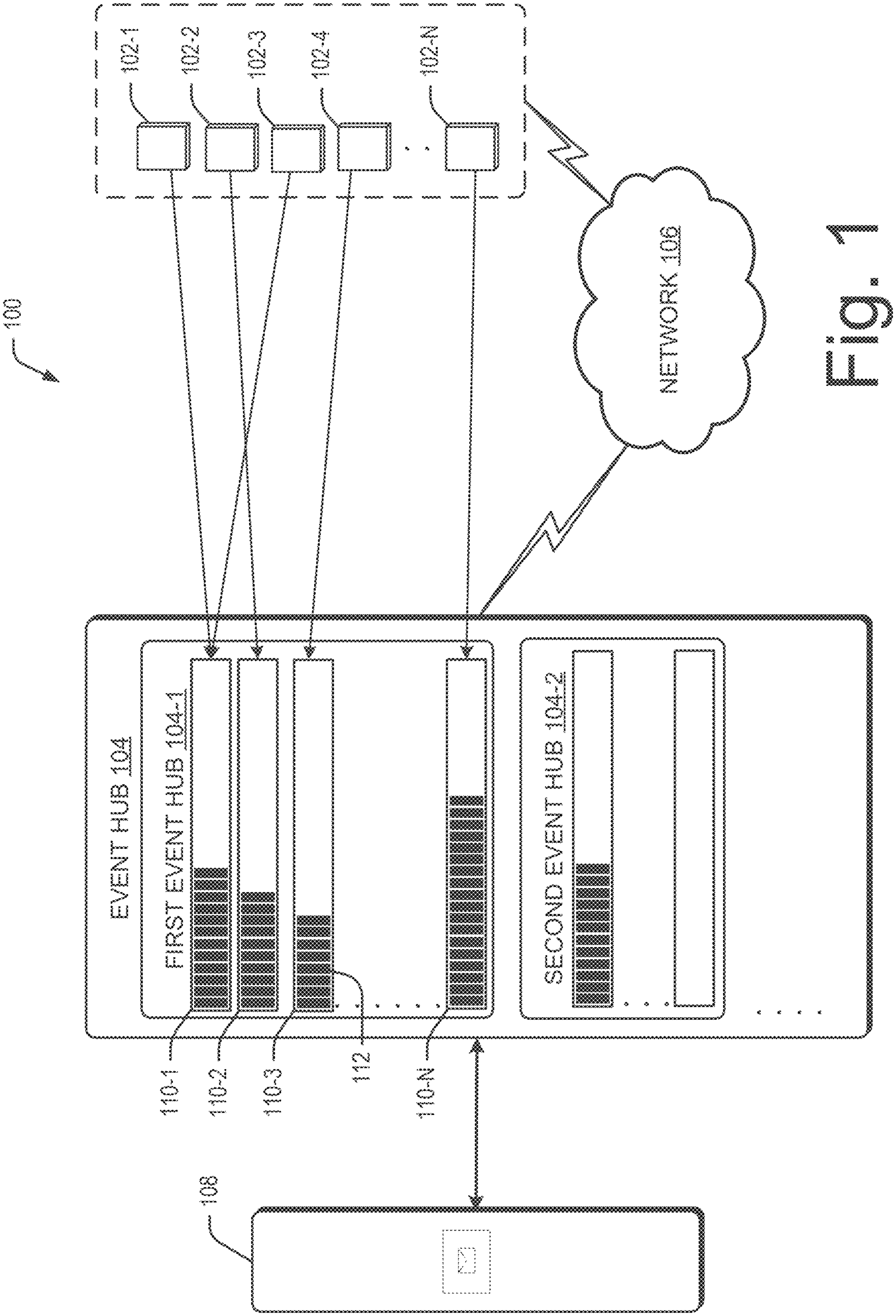
FIG. 1 illustrates a network environment for implementing example techniques to manage data in IoT systems, in accordance with an example implementation of the present subject matter.

In the context of IoT (Internet of Things) systems, one of the critical challenges faced by service providers is the effective management of data overload from a single IoT device or multiple IoT devices transmitting data simultaneously. As the number of connected devices in the IoT systems increases, the volume of incoming data can rapidly exceed the processing capabilities of primary data hub of the IoT systems and applications subscribed to the incoming data in the downstream services, leading to significant performance degradation, increased latency, and, in extreme cases, complete service failure.

Such situations are particularly exacerbated by compromised or rogue IoT devices—those that malfunction or are misconfigured and are sending excessive amounts of data, can overwhelm the data processing infrastructure of the IoT system. Consequently, these rogue IoT devices not only contribute to a backlog of unprocessed data but can also lead to the loss of vital information from other functioning devices, thus impairing the reliability and data integrity.

Further, the existing architectures often lack mechanisms to dynamically detect and isolate such rogue IoT devices, resulting in a one-size-fits-all approach to data processing that fails to account for the varying capacities and operational states of individual IoT devices. Without adequate monitoring and control, important data can be lost or delayed, negatively impacting real-time decision-making and operational efficiency. Additionally, the inability to implement selective rate limiting for rogue devices complicates the problem, as the primary hub is required to continue to process legitimate data from other IoT devices while managing the unexpected surge of traffic from the rogue devices.

When a compromised device floods the IoT system with data, it may trigger the same overload conditions as a malfunctioning device, but with more severe implications. Further, the attacker's ability to manipulate device behavior can lead to intentional disruption of service, data corruption, or creation of vulnerabilities that can be exploited for further malicious activities.

The combined effect of these challenges leads to a struggle in maintaining a consistent performance of IoT systems under variable load conditions, resulting in reduced service quality and diminished user satisfaction. Therefore, there is a need for a robust solution that not only identifies and mitigates the impact of rogue devices on the IoT infrastructure but also implements a throttling mechanism for ensuring that the IoT system is capable of processing critical data from all devices in a timely manner. This approach aims to enhance the reliability, efficiency, and scalability of IoT systems in handling high volumes of data traffic while preserving data integrity and availability.

The proposed solution addresses the challenges of managing data overload in IoT systems by introducing a mechanism that identifies and isolates rogue IoT devices. This solution involves creation of a secondary data hub configured to handle excessive traffic generated by the rogue IoT devices. The primary data hub remains responsible for processing legitimate data from functional devices, ensuring that critical data is not lost in the event of an overload.

According to example implementations of the present subject matter, techniques that enable managing data of the IoT systems are described. These techniques may help prevent overload scenarios and ensure efficient processing of large volumes of real-time telemetry data in IoT systems.

In accordance with example embodiments of the present subject matter, a first event hub is monitored to determine the rate at which telemetry data is being received. The first event hub is to receive telemetry data from a plurality of IoT devices and provide the telemetry data to one or more applications subscribed to the telemetry data. This feature enables identification of anomalies in data generation of IoT devices by observing the rate of receipt of data in the event hub.

In an embodiment, based on the monitoring, an IoT device generating telemetry data at a rate exceeding a predefined threshold is identified. This may involve analyzing the telemetry data streams received at the first event hub and comparing their rates to the predetermined threshold to detect IoT devices producing high volumes of data above the predetermined threshold. This feature enables action to be taken to ensure stable operation of the IoT system.

Further, in an example embodiment, once the IoT device generating telemetry data above the predetermined threshold is identified, the identified IoT is configured to send its telemetry data to a second event hub. This second event hub is configured to process the telemetry data from IoT devices generating high-throughput telemetry data. These features enable distribution of the data load across event hubs, ensuring that the first event hub can continue to process data efficiently from other IoT devices.

Further, in an example embodiment, a throttling rate is determined for the second event hub to apply to the telemetry data from the identified IoT device. In accordance with an example embodiment of the present subject matter, the throttling rate defines the rate at which telemetry data is delivered to the one or more applications subscribed to it. This feature enables prevention of potential overloads or delays at the application level subscribed to receive the telemetry data from the identified IoT device by regulating the flow of telemetry data.

Further, in an embodiment, the second event hub applies the throttling rate and transmits the telemetry data from the identified IoT device to the one or more applications. In an example implementation of the present subject matter, this throttling ensures that the telemetry data is delivered at a pace suitable for the applications' processing capacities. This feature enables consistent and reliable operation of the IoT systems without disruptions.

By redirecting incoming telemetry data from high-throughput IoT devices to a second event hub, the processing workload is distributed more evenly across event hubs. This distribution helps prevent any single event hub from becoming overloaded, thereby maintaining consistent performance and enabling scalability within the IoT environment. Further, by applying a throttling mechanism, risks such as data overflow or application overload are minimized. This ensures telemetry data is delivered at a pace suitable for application processing, reducing the likelihood of packet loss or delays.

The above techniques are further described with reference to FIG. 1 to FIG. 9. It should be noted that the description and the Figures merely illustrate the principles of the present invention along with examples described herein and should not be construed as a limitation to the present invention. It is thus understood that various arrangements may be devised that, although not explicitly described or shown herein, embody the principles of the present invention. Moreover, all statements herein reciting principles, aspects, and implementations of the present invention, as well as specific examples thereof, are intended to encompass equivalents thereof.

FIG. 1 illustrates a network environment 100 for implementing examples techniques to manage data in IoT systems, in accordance with an example implementation of the present subject matter.

The term 'IoT systems' refers to internet-based cloud services that facilitate connecting, monitoring, and control of IoT devices on a large scale. IoT systems may comprises a multitude of interconnected IoT devices capable of collecting, transmitting, and exchanging data, including, but limited to, real-time information such as temperature readings, location data, system status, or other relevant metrics. Such data is integral for ensuring the efficient operation of IoT devices within the IoT systems.

In an example implementation of the present subject matter, the network environment 100 comprises a plurality of IoT devices 102-1, 102-2, 102-3, . . . , and 102-N in a network environment 100, each configured to perform functions within the network environment 100. The IoT device may, in an example, consist of a circuit board equipped with sensors, actuators, and other connected devices utilizing Wi-Fi or other communication technologies to connect to the internet. In an example, the plurality of IoT devices 102-1, 102-2, 102-3, . . . , and 102-N may be deployed in diverse locations and settings, such as, Smart Home Systems may integrate multiple IoT devices to enhance user comfort, improve energy efficiency, and bolster security. Similarly, office environments may utilize a plurality of IoT devices for purposes such as asset tracking, environmental monitoring, and workspace optimization.

In an example embodiment, each of the plurality of IoT devices 102-1, 102-2, 102-3, . . . , and 102-N may be equipped with communication capabilities, enabling it to transmit data, known as 'Telemetry Data', to subscribed applications within downstream services and also to receive commands from other network components if required. In an example, the telemetry data may include various types of information collected by the plurality of IoT devices 102-1, 102-2, 102-3, . . . , and 102-N, such as sensor readings, device status, operational metrics, and other relevant data points that provide insights into the functioning and environment of the IoT devices. In an example, the telemetry data may also include timestamps, device identifiers, and geolocation data, enabling precise tracking and analysis of device behavior over time and across different locations.

In an example embodiment, the pluralities of IoT devices 102-1, 102-2, 102-3, . . . , and 102-N are connected to one of more event hubs of the IoT system. In the context of the IoT systems, an event hub 104 is a distributed data streaming platform used for collecting and managing real-time telemetry data from multiple sources, such as IoT devices. In this context, the data generated by an IoT device may be, for example, sensor readings, status updates, or system logs. The event hubs 104 can handle data from a wide range of devices, including sensors, meters, and embedded systems, processing it in a sequential manner to ensure data continuity. In an example, the event hub 104 serves as a central point where telemetry data from the plurality of IoT devices 102-1, 102-2, 102-3, . . . and 102-N is ingested, temporarily stored, and transmitted to designated endpoints. In an example, these endpoints are one or more applications or services that are subscribed to receive the telemetry data. In an example, the event hub 104 may be physically implemented as a computing device, such as a server.

In an example implementation, the plurality of event hubs 104 may comprise at least a first event hub 104-1 and a second event hub 104-2. For the sake of simplicity of depiction, only the first event hub 104-1 and the second event hub 104-2 have been shown in FIG. 1. However, other hubs may also be present, and it may be understood that the principles and techniques described herein with respect to the first event hub 104-1 and the second event hub 104-2 may be applicable to any number of event hubs within the network environment 100.

In an example implementation, each of the event hub 104-1, 104-2, . . . , 104-N within the plurality of event hubs 104 comprises a plurality of partitions 114, wherein the first event hub 104-1 comprises partitions 110-1, 110-2, 110-3, . . . , and 110-N, such that, IoT device 102-1 is mapped to partition 110-1, IoT device 102-2 is mapped to partition 110-2, etc. In an example, multiple IoT device may be mapped with a single partition, such as IoT device 102-1 and device 102-3 may be mapped to same partition 110-1. In an example, a partition within each event hub among the plurality of event hubs acts as an independent sequence of messages, which represents units of telemetry data that are transmitted by the plurality of IoT devices 102-1, 102-2, 102-3, . . . , and 102-N. When new messages arrive from an IoT device among the plurality of IoT device 102-1, 102-2, 102-3, . . . , and 102-N, the message is appended sequentially at the end of the respective partition's event sequence identified by their position 112. In an example, each partition acts as a commit log—an append-only, ordered data structure—to facilitate tracking and managing telemetry data from IoT devices 104-1, 104-2, 104-3, . . . , and 104-N.

In an example implementation, each of the plurality of IoT devices 102-1, 102-2, 102-3, . . . , and 102-N are connected to the event hub 104 through network 106. In an example, the network 106 may be a single communication network or a combination of multiple communication networks and may use a variety of different communication protocols. The network 106 may be a wireless network, a wired network, or a combination thereof. Examples of such individual communication networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), Public Switched Telephone Network (PSTN). Depending on the technology, the network 106 may include various network entities, such as gateways, routers; however, such details have been omitted for the sake of brevity of the present description.

In some instances, one or more of the IoT devices 102-1, 102-2, 102-3, . . . , and 102-N within an IoT system may experience malfunctions or operational anomalies. Such malfunctions can lead to the production of unusually high volumes of data, which may be attributed to factors such as faulty sensors, software errors, or interruptions in data transmission protocols. In some cases, an IoT device may be inadvertently misconfigured, or a rogue user may intentionally misconfigure an IoT device. Thus, there can be various reasons for increase in volume of data from such devices This unexpected increase in data traffic can overload the applications and services subscribed to receive the telemetry data, resulting in potential performance degradation or, in severe cases, complete operational failures of these applications.

In an example implementation, the network environment 100 further comprises a data management system 108 implemented to manage the flow of data from the plurality of IoT devices 102-1, 102-2, 102-3, . . . , and 102-N through the event hubs 104 to the subscribed applications or services, ensuring that the IoT systems are operating efficiently and effectively.

In an example implementation, the data management system 108 may be any computing device, such as a server, a desktop computer, a laptop, a smartphone, or a tablet. The data management system 108 may comprise at least one processors for executing the management of data in IoT systems. In an example, the processor may be implemented as microprocessors, microcomputers, microcontrollers, digital signal processors, central processing units, state machines, logic circuitries, and/or any devices that manipulate signals based on operational instructions. The data management system 108 may comprise a memory (not shown) for storing the instructions executable by the at least one processor. The memory may include any computer-readable medium known in the art including, for example, volatile memory (e.g., RAM), and/or non-volatile memory (e.g., EPROM, flash memory, etc.). The memory may also be an external memory unit, such as a flash drive, a compact disk drive, an external hard disk drive, or the like.

In an example, the data management system 108, may be connected the plurality of event hubs 104 through the above-described network environment 100. Thus, the network 106 connectivity allows for communication and data exchange between the various components of the IoT system enabling real-time data acquisition, processing, and analysis.

In an example embodiment, to illustrate the operation of the data management system 108 to manage the telemetry data from the IoT devices 104-1, 104-2, 104-3, . . . , and 104-N, it may be assumed that IoT device 104-1 may be mapped to the first partition 110-1 of the first event hub 104-1, while IoT device 104-2 may be mapped to the second partition 110-2 of the first event hub 104-1. In some instances, multiple IoT devices may also be mapped to the same partition, for example, both IoT devices 104-1 and 104-4 may be mapped to the first partition 110-1 of the first event hub 104-1.

In operation, the data management system 108 monitors the rate of telemetry data received at the first event hub 104-1 from the plurality of IoT devices 102-1, 102-2, 102-3, . . . , and 102-N. For instance, data management system 108 may monitor the telemetry data received at respective partitions. Upon detecting that the rate of receipt of telemetry data exceeds a predefined threshold, the data management system 108 identifies an IoT device among the plurality of IoT devices 102-1, 102-2, 102-3, . . . , and 102-N that has caused the telemetry data to exceed the predetermined threshold. For example, if IoT device 104-3 is determined to be generating telemetry data at a rate surpassing the threshold due to various reasons discussed above, the data management system 108 recognizes IoT device 104-3 to be a rogue device.

Based on this identification, the data management system 108 reconfigures the identified rogue device, i.e., IoT device 104-3 in the present example, to direct its telemetry data to a second event hub 104-2. This second event hub 104-2 is configured to process telemetry data from the IoT device 104-3. The data management system 108 further determines a throttling rate for the second event hub 104-2. As will be apparent to a person skilled in the art, the throttling rate specifies the rate at which telemetry data from IoT device 104-3 will be delivered to the subscribed applications or services.

In an example, the calculated throttling rate allows for the applications to receive the telemetry data at a controlled and optimal pace, preventing overloads. In an example implementation of the present subject matter, the data management system 108 initiates the transmission of the telemetry data from the second event hub 104-2 to the services and applications at the determined throttling rate. Hence, the data management system 108 enables smooth functioning of one or more applications within IoT systems. Even in situations where one or more of the IoT devices are rendered malfunctional and generate excessive messages, the first event hub 104-1 can maintain its normal operations, including receiving, processing, and forwarding telemetry data from the remaining IoT devices to their respective subscribed one or more applications while the second event hub 104-2 is tasked with handling the one or more malfunctioning the IoT devices. This uninterrupted service is essential for real-time monitoring, analytics, and decision-making processes that rely on continuous data streams from multiple IoT devices, ensuring that key messages are captured and transmitted without delay or loss.

Thus, the data management system of the present subject matter provides for improvement in managing telemetry data in IoT systems by addressing the challenges associated with sudden spikes in data generation at the device level. This is accomplished through the monitoring and regulation of data flowing from IoT devices via event hubs to subscribed applications. The system achieves this by dynamically reconfiguring data routing paths and implementing throttling mechanisms, thereby mitigating the risk of overload scenarios that could lead to system failures, reduced performance, or other operational inefficiencies.

To illustrate the implementation of the data management system 108, consider an example involving an industrial facility equipped with multiple IoT devices, identified as 102-1, 102-2, 102-3, . . . , and 102-N. These devices may be deployed to monitor various parameters of a manufacturing process carried out in the industrial facility. For example, a temperature sensor 102-1 may be mounted on production equipment, a vibration sensor 102-2 on a machinery, and a flow meter 102-3 on pipelines. Within a communication network of the facility, an event hub 104 may operate as a centralized data ingestion platform capable of processing the telemetry data from the plurality of IoT devices 102-1, 102-2, 102-3, . . . , and 102-N distributed throughout the industrial facility. Processing the telemetry data from the plurality of IoT devices 102-1, 102-2, 102-3, . . . , and 102-N may serve various purposes, for example, monitoring that the manufacturing process is progressing as per standards operating procedures.

The event hub 104 comprises a plurality of hubs, such as a first event hub 104-1, a second event hub 104-2, . . . , and 104-N. Each of the plurality of event hub comprises a plurality of partitions. For example, the first event hub 104-1 comprises a plurality of partitions 110-1, 110-2, 110-3 . . . , and 110-N, such that the first IoT devices 102-1, which includes the temperature sensor may be mapped to send the telemetry data to the first partition 110-1. Similarly, second IoT devices 102-2, which includes the vibration sensor may may be mapped to send the telemetry data to the second partition 110-2, IoT device 102-3, which includes the flow meter may be mapped to send the telemetry data to the third partition 110-3 of the first event hub 104-1. The respective partitions may furnish the telemetry data from the respective sensor to one or more industrial control systems for monitoring that the manufacturing process. For example, a control system may monitor the data received from the temperature sensor on a real-time basis to generate an alert if the temperature exceeds the limits prescribed by the standards operating procedures.

Under normal operating conditions, these plurality of IoT devices 102-1, 104-2, 102-3, . . . , and 102-N transmit the telemetry data at consistent and expected rates to event hub 104-1, while the data management system 108 continuously monitors data flow across all partitions in each of the event hubs to ensure optimal performance. If an operational anomaly occurs, for example, an IoT device 102-1 transmitting data at an abnormally high frequency can lead to a telemetry data flow rate in partition 110-1 of event hub 104-1 to exceed the predefined threshold. Upon detection of this anomaly, the data management system 108 identifies IoT device 102-1 as the source of the excessive data transmission. In an example, to prevent system overload and ensure continuous data processing within the industrial facility, the data management system 108 may reconfigure the data routing by redirecting the telemetry data from IoT device 102-1 to a second event hub 104-2.

In one example implementation, the second event hub 104-2 may be a redundant hub implemented within the industrial communication network of the facility to act as a backup in the event of failure of the first event hub 104-1 or to handle occasional excessive load. The data management system 108 then determines an appropriate throttling rate for event hub 104-2, taking into account factors such as the processing capabilities of subscribed applications, the criticality of the temperature data, and current system load.

Once the data management system 108 establishes the throttling rate, event hub 104-2 begins transmitting the telemetry data from IoT device 102-1 at the controlled rate to the industrial control systems. This regulated data flow ensures that the industrial control systems remain functional without becoming overloaded or experiencing significant delays. Concurrently, event hub 104-1 continues processing and transmitting data from the vibration sensors, flow meters, and other temperature sensors to their respective industrial control systems, thereby preserving uninterrupted operations across the facility. This approach enables facility operators to maintain a comprehensive and real-time overview of the production process while effectively managing anomalous sensor data independently, thereby optimizing both performance and reliability within the system.

Figure 2:
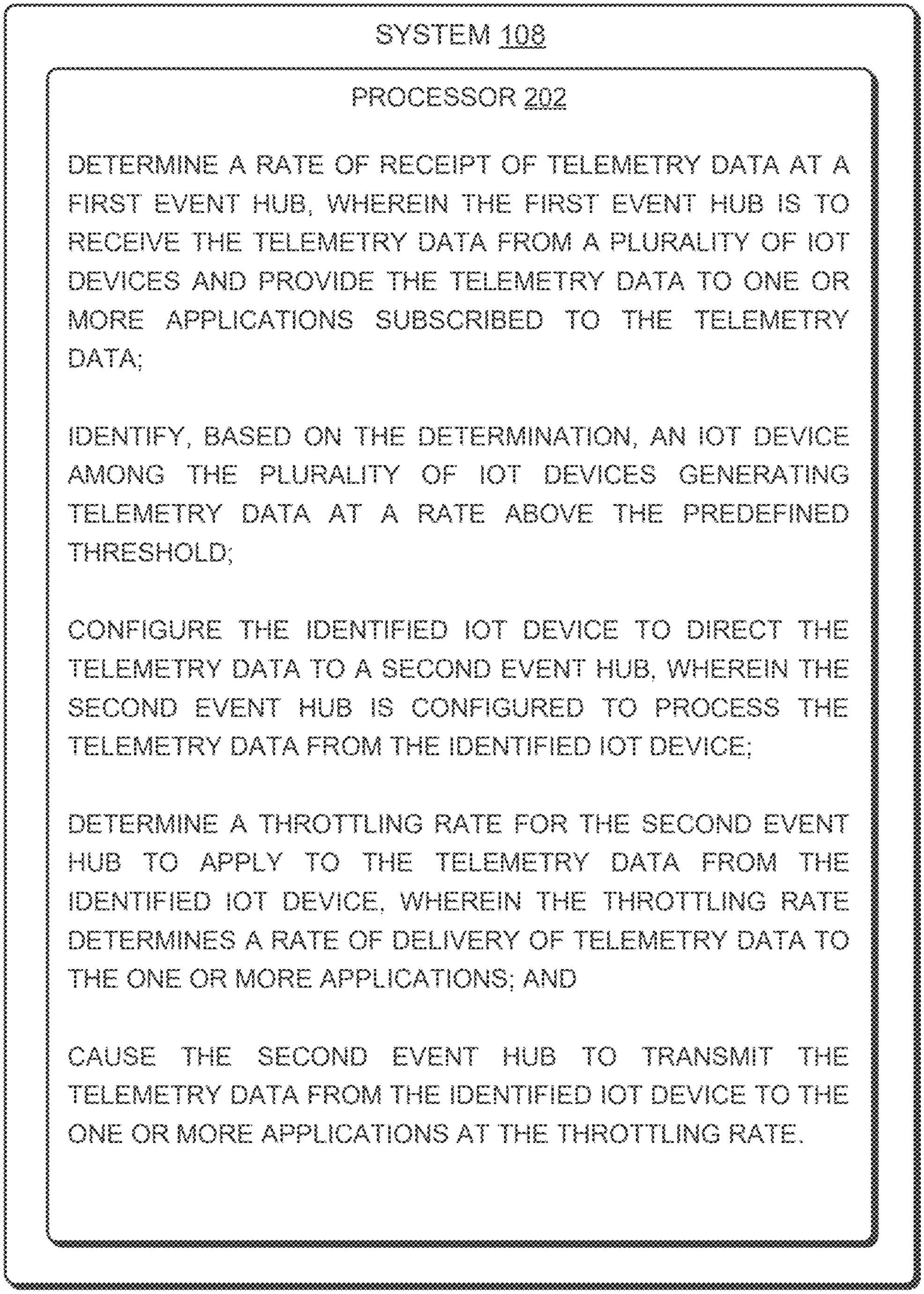
FIG. 2 illustrates a system for implementing example techniques to manage data in IoT systems, in accordance with an example implementation of the present subject matter.

FIG. 2 illustrates the data management system 108 for managing data in IoT system, according to an example implementation of the present subject matter. In an example, the system 108 for managing incoming data from the plurality of IoT devices 102-1, 102-2, 102-3, . . . , and 102-N, is operable such that the data management system 108 can efficiently process and manage surge in transmission rates of telemetry data from one or more IoT devices.

The data management system 108 may be one or more computing devices, such as desktop computers, laptops, smartphones, personal digital assistants (PDAs), tablets and servers. In an example, the data management system 108 may comprise a processor 202. In an example, the processor 202 may be implemented as microprocessors, microcomputers, microcontrollers, digital signal processors, central processing units, state machines, logic circuitries, and/or any devices that manipulate signals based on operational instructions. The data management system 108 may comprise a memory for storing the instructions executable by the one or more processors. The instructions may cause the processor to manage at least one stage of the lifecycle of the products. The memory may include any computer-readable medium known in the art including, for example, volatile memory (e.g., RAM), and/or non-volatile memory (e.g., EPROM, flash memory, etc.). The memory may also be an external memory unit, such as a flash drive, a compact disk drive, an external hard disk drive, or the like.

In an example, the processor 202 of the data management system 108 processes executable instructions that may be stored in the memory, for example, to manage telemetry data in IoT systems as when there is a surge in incoming telemetry data from any of the plurality of IoT devices 102-1, 104-2, 102-3, . . . , and 102-N. As explained previously, the telemetry data may include various types of information sensed or collected by the plurality of IoT devices 102-1, 102-2, 102-3, . . . , and 102-N, such as sensor readings, device status, operational metrics, and other relevant data points that provide insights into the functioning and environment of the IoT devices. In an example, the telemetry data may be provided to various downstream services that consume and process the telemetry data from the plurality of IoT devices 102-1, 102-2, 102-3, . . . , and 102-N. In an example, these downstream services may include data analytics platforms, machine learning models, visualization tools, and other applications that derive insights from the telemetry data, for instance, to optimize and control processes to which the telemetry data may pertain.

In operation, the system 108 may determine a rate of receipt of telemetry data at a first event hub 104-1. In an example, the first event hub 104-1 is configured to receive telemetry data from a plurality of IoT devices 102-1, 102-2, 102-3, . . . , and 102-N, and provide the telemetry data to one or more applications subscribed to the telemetry data. In an example, to determine the rate of receipt of telemetry data, the data management system 108 may count the number of messages received at the first event hub 104-1 from the plurality of IoT device 102-1, 102-2, 102-3, . . . , and 102-N over a defined time period, such as messages per second. In another example, to determine the rate of receipt of telemetry data, the data management system 108 may calculate an average rate of receipt of telemetry data over multiple time intervals to account for normal fluctuations in data transmission.

Referring to the previous example, in the industrial facility scenario, the plurality of IoT devices 102-1, 102-2, 102-3, . . . , 102-N may be implemented to monitor various aspects of the production process. For example: temperature sensors 102-1, vibration sensor 102-2, flow meter 102-3 may be connected in an industrial communication network. The first event hub 104-1 receives telemetry data from these plurality of devices 102-1, 102-2, 102-3, . . . , and 102-N. The data management system 108 is implemented to continuously monitor the rate of receipt of telemetry data at the first event hub 104-1, ensuring that it maintains the performance of the plurality of partitions 110-1, 110-2, 110-3, . . . , and 110-N. This monitoring involves assessing the data flow rates from the connected IoT devices to identify any irregularities in the data transmission rates.

The processor 202 of the data management system 108 may then identify, based on the determination, an IoT device among the plurality of IoT devices 102-1, 102-2, 102-3, . . . , and 102-N generating the telemetry data at a rate above the predefined threshold. In an example, the data management system 108 may compare this determined rate to a predefined threshold to identify an IoT device within the plurality of IoT devices 102-1, 102-2, 102-3, . . . , and 102-N generating high data volume. In an example, the predefined threshold may refer to a predetermined limit or benchmark to indicate an acceptable rate of telemetry data reception and processing at the first event hub 104-1. This threshold set by the IoT system's administrators or developers to be complied with for maintaining optimal performance and preventing overload in IoT systems. In an example, the predefined threshold may be based on factors such as the processing capacity of event hubs and the capacity of the subscribed applications.

In an example, to identify the IoT device generating telemetry data at the rate above the predefined threshold, the data management system 108 may investigate each partition among a plurality of partitions 110-1, 110-2, 110-3, . . . , and 110-N in the first event hub 104-1, each partition being configured to process incoming telemetry data from one or more corresponding IoT devices among the plurality of IoT devices 102-1, 104-2, 102-3, . . . , and 102-N. By identifying the problematic IoT device, the data management system 108 may take targeted action to address the issue without affecting the normal operation of other remaining IoT devices in the IoT system.

Reference is made to the previous example of the industrial facility wherein the IoT devices 102-1, 102-2, 102-3, . . . , 102-N, such as the temperature sensors 102-1, vibration sensor 102-2, and flow meter 102-3 monitor various aspects of the production process. The first event hub 104-1 is responsible for receiving and processing the telemetry data from these IoT devices 102-1, 102-2, 102-3, . . . , 102-N and transmitting it to one or more applications subscribed to the telemetry data. As system 108 continuously or intermittently monitors the rate of receipt of telemetry data within event hub 104-1, it establishes baseline data flow rates for normal operations over a period of time. This allows system 108 to detect any deviations or irregularities. In an example scenario, the IoT device 102-1, i.e., the temperature sensor may suddenly begin transmitting data at an unusually high rate due to a malfunction or unexpected change in temperature. When system 108 recognizes that the data transmission rate from IoT device 102-1 surpasses the predefined threshold set for that device type, it flags this anomaly to system operators. This helps to pinpoint the specific device contributing to the overload in the partition 110-1 of event hub 104-1. Thus, along with identifying and isolating a malfunctioning device, the system provides the ability to alert the system operators who can take corrective actions, preventing disruptions to the data flow.

In an example, the identification process may involve examining metadata associated with the incoming telemetry data to pinpoint the source of excessive data generation. In an example, the metadata may include IoT device IDs, timestamps that indicate when the messages within telemetry data were sent, data types that specify the nature of the transmitted telemetry data. For example, if an IoT device such as a temperature sensor normally sends data every 5 minutes, but starts transmitting more data frequently, the timestamps may reveal this change. In an example, the timestamps, in combination with other metadata, may allow the system to identify the rogue IoT device generating data above the predefined threshold in the first event hub 104-1.

The processor of the data management system 108 may then configure the identified IoT device to direct the telemetry data to a second event hub 104-2. In an example, the second event hub 104-2 is configured to process the telemetry data from the identified IoT device generating telemetry data above the predetermined threshold. In an example, the redirection of telemetry data serves multiple purposes in managing the IoT system efficiently. Firstly, it isolates the high-volume data stream from the identified IoT device, preventing potential overload or performance degradation of the first event hub 104-1. This ensures that the normal operation of other IoT devices connected to the first event hub 104-1 remains unaffected. Secondly, the second event hub 104-2 can be specifically configured to handle the increased data flow from the identified IoT devices. By leveraging a separate event hub for processing the excess telemetry data, the data management system 108 maintains overall system stability while providing flexibility to address anomalies in data generation from individual IoT devices.

Referring to previous example, in the context of the industrial facility, once system 108 identifies that IoT device 102-1 is transmitting temperature data at a rate exceeding the predefined threshold that may cause data overload in partition 110-1 to which the IoT device 102-1 is mapper, a reconfiguration step is initiated to redirect the telemetry data from the identified IoT device 102-1 to a secondary event hub 104-2. In an example, system 108 sends configuration instructions to IoT device 102-1, adjusting its data routing parameters so that instead of continuing to send its telemetry data to the first event hub 104-1, it now directs this data to the second event hub 104-2.

In one implementation, the second event hub 104-2 may be a hub implemented for back-up or load balancing purposes within the facility's industrial communication network. This backup hub may be designed to take over operations if the primary event hub 104-1 experiences a failure, or to assist in processing during instances of unusually high data traffic. The second event hub 104-2 may thus handle overflow or specialized data processing and is capable of managing the increased data flow from IoT device 102-1 without impacting the overall performance of the system. This reconfiguration ensures that the first event hub 104-1 remains within its operational limits and that the second event hub 104-2 can efficiently process the redirected data. Thus, the first event hub 104-1 continues to manage and process data from other IoT devices, such as vibration sensors 102-2 and flow meters 102-3, without interruption.

The processor of the system 108 may then configure the system to determine a throttling rate for the second event hub 104-2 to apply to the incoming telemetry data from the identified IoT device. In an example, the throttling rate determines a rate of delivery of telemetry data to the one or more applications subscribed to receive the telemetry data. This throttling mechanism is a crucial component in managing the flow of data within the IoT system, particularly when dealing with IoT devices that are generating unusually high volumes of telemetry data.

In an example implementation, the throttling rate is calculated based on several factors to ensure optimal system performance and data integrity. In an example, the throttling rate conforms to processing capabilities of the one or more applications subscribed to the telemetry data. By considering these factors, the data management system 108 can dynamically adjust the throttling rate to optimize data flow, ensuring that one or more subscribed applications receive a manageable stream of telemetry data without compromising their performance or the overall integrity of the IoT system.

Referring to the previous example of the industrial facility comprises multiple IoT devices, for example, temperature sensors, vibration sensors, and flow meters that continuously transmit telemetry data to event hubs 104-1, once the data management system 108 reconfigures the data routing, the telemetry data of the malfunctioning temperature sensor 102-1 is redirected from the first event hub 104-1 to the second event hub 104-2. The data management system 108 determines a throttling rate to be applied to the telemetry data in the second event hub 104-2 for controlling the rate at which the telemetry data is delivered from the temperature sensor 102-1 to the second event hub 104-2 and eventually to the subscribed application. The data management system 108 calculates the throttling rate based on several factors, ensuring the throttling mechanism strikes a balance between performance, reliability, and system stability The processor of the system 108 may then execute instructions to cause the second event hub 104-2 to transmit the telemetry data from the identified IoT device to the one or more applications at throttling rate. The second event hub 104-2, now responsible for handling the data stream from the identified IoT device, applies the throttling rate to regulate the flow of telemetry data from the identified IoT device to the one or more applications subscribed to the telemetry data. This controlled transmission in the second event hub 104-2 helps prevent overloading the subscribed applications or services with a sudden influx of telemetry data, which could lead to processing delays or instability in IoT system. In an example, the data management system 108 is further configured to generate an alert directed to one or more users to investigate and resolve issues corresponding to the identified IoT device resulting in the identified IoT device generating telemetry data at the rate above the predefined threshold. To elaborate on the functionality of the system 108 to manage data in IoT systems, reference is made to FIG. 3.

Figure 3:
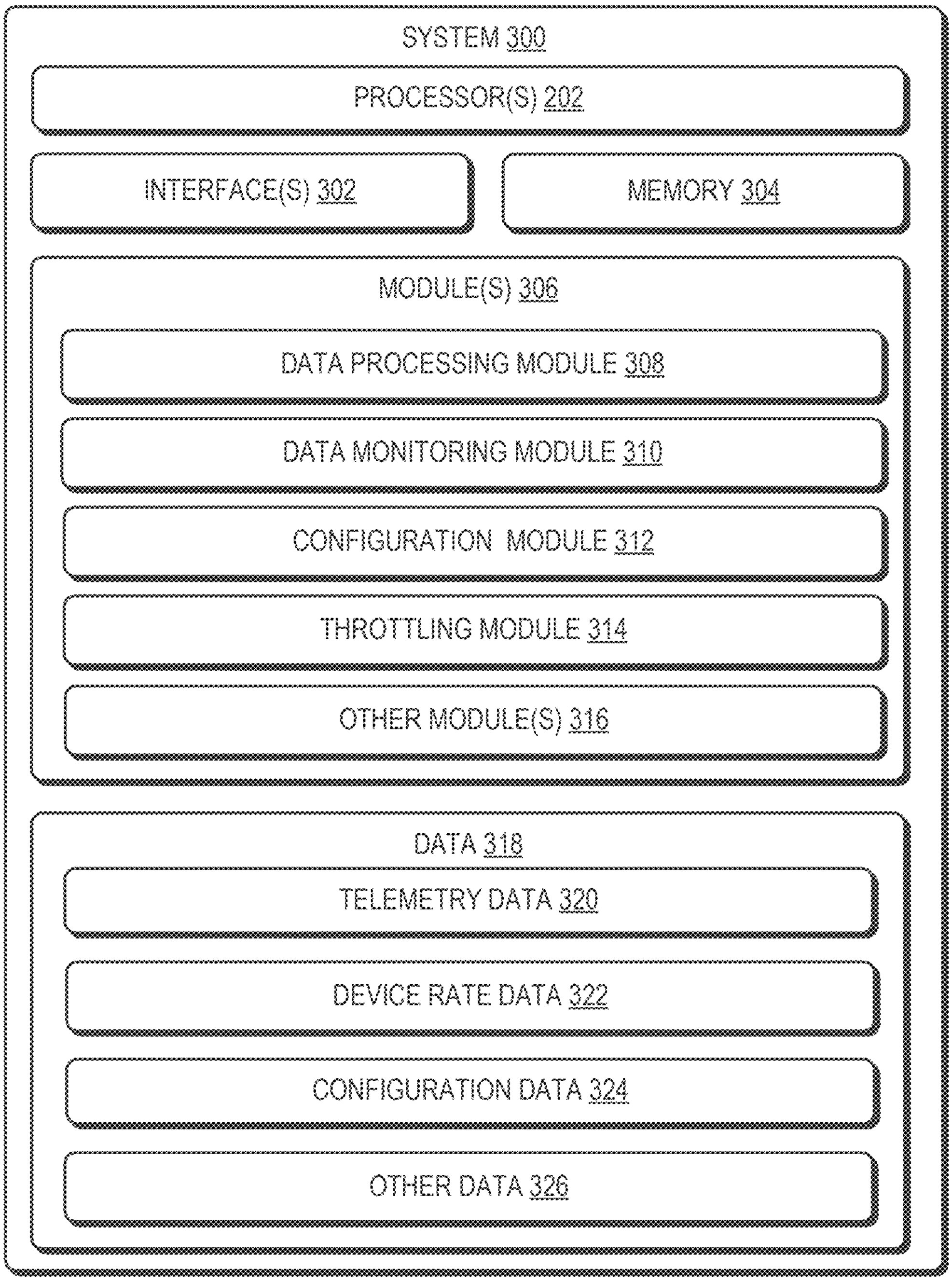
FIG. 3 illustrates a system for implementing example techniques to manage data in IoT systems, in accordance with another example implementation of the present subject matter.

FIG. 3 illustrates the data management system 300 (system 300 hereinafter) for managing data in IoT systems, according to another example implementation of the present subject matter. In an example, the system 300 is similar to data management system 108, as explained in reference to FIGS. 1 and 2. In an example, the system 300 may be any computing device. Examples of the system 300 may include but are not limited to servers, desktop computers, laptops, smartphones, personal digital assistants (PDAs), and tablets.

In an example, the system 300 comprises a processor, such as the above-described processor 202. In an example, the processor 202 may be implemented as microprocessors, microcomputers, microcontrollers, digital signal processors, central processing units, state machines, logic circuitries, and/or any devices that manipulate signals based on operational instructions. The system 300 also comprises interface(s) 302 coupled to the processor 202. The interface(s) 302 may include a variety of software and hardware interfaces that allow interaction of the system 300 with other communication and computing devices, such as network entities, web servers, and external repositories, and peripheral devices. The interface(s) 302 may enable coupling of internal components of the system 300 with each other.

Further the system 300 comprises a memory 304 coupled to the processor 202. The memory 304 may include any computer-readable medium known in the art including, for example, volatile memory, such as Static Random-Access Memory (SRAM) and Dynamic Random-Access Memory (DRAM), and/or non-volatile memory, such as Read Only Memory (ROM), Erasable Programmable ROMs (EPROMs), flash memories, hard disks, optical disks, and magnetic tapes. The system 300 may comprise module(s) 306 and data 318 coupled to the processor 202. In one example, the module(s) 306 and data 318 may reside in the memory 304.

In an example, the data 318 may comprise telemetry data 320, device rate data 322, configuration data 324, and other data 326. The module(s) 306 may include routines, programs, objects, components, data structures, and the like, which perform particular tasks or implement particular abstract data types. The module(s) 306 further includes modules that supplement applications on the system 300, for example, modules of an operating system. The data 318 serves, amongst other things, as a repository for storing data that may be fetched, processed, received, or generated by one or more of the module(s) 306. The module(s) 306 may include a data processing module 308, a data monitoring module 310, a configuration module 312, a throttling module 314, and other module(s) 316. The other module(s) 326 may include programs or coded instructions that supplement applications and functions, for example, programs in the operating system of the system 300.

In operation, in an example implementation of the present subject matter, the system 300 manages telemetry data of plurality of IoT devices 102-1, 102-2, 102-3, . . . , and 102-N connected to a first event hub 104-1 among a plurality of event hubs 104 of an IoT system.

The system 300 comprises a data processing module 308 coupled to the processor 202. The processing module 308 is to process the incoming telemetry data 320 from the plurality of IoT devices 102-1, 102-2, 102-3, . . . , and 102-N to the first event hub 104-1. In an example, each of the plurality of event hub may comprise a plurality of partitions 110-1, 110-2, 110-3, . . . , and 110-N to manage the incoming telemetry data 320.

In an example, the function of the data processing module 308 is to receive, parse, and organize the telemetry data 320 as it arrives from the plurality of IoT devices 102-1, 102-2, 102-3, . . . , and 102-N to the first event hub 104-1 for transmitting to the one or more applications subscribed to receive the telemetry data 320. In an example, the data processing module 308 may be configured to determine the rate at which telemetry data 320 is generated by each of the plurality of IoT devices 102-1, 102-2, 102-3, . . . , and 102-N. In an example, the rate of receipt of telemetry data 320 may be determined by calculating an average rate of receipt of telemetry data from each of the plurality of IoT device 102-1, 102-2, 102-3, . . . , and 102-N at the first event hub 104-1 over multiple time intervals.

In an example, the determined rate of each of the plurality of IoT device 102-1, 102-2, 102-3, . . . , and 102-N may be stored in data 318 of the system 300 as device rate data 322.

In an example, the one or more applications may include various software or systems designed to utilize and analyze the data streams from IoT devices. In an example, these applications may serve diverse purposes within the IoT system, enabling organizations to derive valuable insights and take informed actions based on the real-time data collected.

In an example, the data processing module 308 may also perform initial data validation and error checking to verify that the received telemetry data 320 adheres to expected formats, falls within predefined ranges, or meets other quality criteria. To efficiently handle the telemetry data 320 flow from the plurality of IoT devices 102-1, 104-2, 102-3, . . . , and 102-N through the first event hub 104-1, the data processing module 308 performs these checks at the data ingestion stage and helps maintain data integrity throughout the system and flag anomalies or issues with specific IoT devices early in the data flow process.

The data monitoring module 310 of the system 300 is to monitor the volume of receipt of telemetry data 320 by each partitions among the plurality of partitions 110-1, 110-2, 110-3, . . . , and 110-N in the first event hub 104-1. In an example, the data monitoring module 310 is configured to access device rate data 322 of each of the plurality of IoT device 102-1, 102-2, 102-3, . . . , and 102-N to track the incoming data flow to each partition, analyzing metrics such as data volume, frequency of transmissions, and patterns in data generation. In an example, the device rate data 322 may be accessed from data 318. This monitoring may allow the system 300 to detect any anomalies or sudden increases in data transmission from one or more IoT devices.

In an example, the data monitoring module 310 may identify an IoT device among the plurality of IoT device 102-1, 102-2, 102-3, . . . , and 102-N to be generating telemetry data 320 above a predefined threshold. In an example, the data monitoring module 310 analyzes the incoming data streams from each IoT device connected to the first event hub 104-1 and compares the volume and frequency of telemetry data 320 against established baseline metrics or thresholds. In an example, when an IoT device's data generation exceeds the predefined threshold, it is flagged as a rogue IoT device.

The system 300 comprises a configuration module 312 coupled to the processor 202. The configuration module 312 is to configure the identified rogue IoT device to direct the telemetry data 320 to the second event hub 104-2. In an example implementation, the configuration module 312 may redefine the data routing parameters of the rogue IoT device, redirecting its telemetry data 320 from the first event hub 104-1 to the second event hub 104-2.

In an example, the routing process may involve several steps to manage and redirect telemetry data 320 from an IoT device identified to be generating data at a rate exceeding a predefined threshold. In an example, the configuration module 312 uses the configuration data 324 stored in data 318 to redirect the telemetry data 320 from the identified IoT device. In an example, the configuration data 324 is used to configure device twin settings of the identified IoT device. The device twin settings of the identified IoT device comprise a digital representation of the identified IoT device and are stored as JSON documents in the first event hub 104-. In an example, the device twin settings may comprise information about the device's current state, including its unique identifier, connection strings, and routing information.

In an example, to configure the identified IoT device, the configuration module 312 is configured to access the device twin setting associated with the identified IoT device and modify it using the configuration data 324 to update routing information of the identified IoT device. The configuration data 324 stored in data 318 may comprise routing information relating to the new destination, i.e., the second event hub 104-2. In an example, these modifications in the device twin setting may involves updating connection strings or routing information within the JSON document to reflect the new destination, ensuring that the identified IoT device's telemetry data 320 is redirected to the new destination.

As explained previously, the second event hub 104-2 is configured to handle and process the high-volume data from the rogue IoT device. By modifying the device twin settings, the system can dynamically adjust the data flow without requiring direct physical access to the IoT device. This approach ensures minimal disruption to the IoT system while effectively managing the surge in telemetry data 320 from a specific IoT device.

As the configuration module configures address information of the new destination for the identified rogue IoT device, the throttling module 314 of the system 300 is triggered. The throttling module 314 is operable to manage the telemetry data 320 from the identified IoT device arriving at the second event hub 104-2 so that the high rate of incoming data does not adversely impact the applications subscribed to the telemetry data 320 of the identified IoT device. In an example, the throttling rate determines the rate of delivery of telemetry data 320 to applications subscribed to receive the telemetry data 320.

In an example implementation, the throttling rate is calculated based on several factors to ensure optimal system performance and data integrity. In an example, the throttling rate may conform to the processing capabilities of the one or more subscribed applications to prevent overloads in IoT system and ensure continuous operation. By regulating the telemetry data transmission, the applications can receive telemetry data 320 in a controlled and manageable manner.

In an example, the throttling module 314 may implement various throttling mechanisms, including but not limited to token bucket algorithms, leaky bucket algorithms, or fixed window counters. These mechanisms may help to ensure that the data transmission rate remains within specified limits, even during periods of high data generation. In an example, the throttling module 314 may dynamically adjust the throttling rate based on real-time feedback from the one or more subscribed applications.

In an example implementation, once the throttling module 314 calculates the throttling rate for the telemetry data 320, generated by the identified IoT device, the throttling rate is provided to the second event hub 104-2. In an example, the second event hub 104-2 utilizes this throttling rate to regulate the transmission of telemetry data 320 to the applications subscribed to receive it. This ensures that the data flow adheres to the calculated rate, preventing overloading of downstream systems and maintaining an efficient and controlled data delivery process.

In an example, based on identifying the rogue IoT device to be generating data above a predefined threshold, the data monitoring module may be configured to generate an alert directed to one or more users to investigate and resolve issues corresponding to the identified IoT device. This alert may provide information about the IoT device that is generating telemetry data 320 at a rate above the predefined threshold. In an example, the alert may include details such as the IoT device identifier, the current data generation rate, the normal expected rate, and the time when the anomaly was detected.

In some implementations, the alert may also include suggestions for potential causes of the increased data generation, such as sensor malfunctions, software errors, or environmental factors. In an example, the data monitoring module may be configured to send these alerts through various channels, such as email notifications, SMS messages, or dashboard notifications within the IoT management interface. By generating an alert, the system 300 may facilitate timely interventions when anomalies are detected.

In an example implementation, once the telemetry data 320 from the rogue IoT device is directed to the second event hub 104-2, the data monitoring module 310 may initiate monitoring the second event hub 104-2 to determine when the rate of receipt of telemetry data 320 from the identified IoT device returns below a predefined threshold. This monitoring may involve examining the partition among the plurality of partitions within the second event hub 104-2, which is configured to handle incoming telemetry data 320 from the identified rogue IoT device. When the rate of telemetry data 320 from the identified IoT device stabilizes and falls below the predefined threshold in the second event hub 104-2, the configuration module 312 is triggered. The configuration module 312 is configured to remap the data routing of the identified IoT device back to the first event hub 104-1, restoring its primary data processing path. This approach helps reinstate the original configuration and maintains consistent performance in IoT systems.

Figure 4:
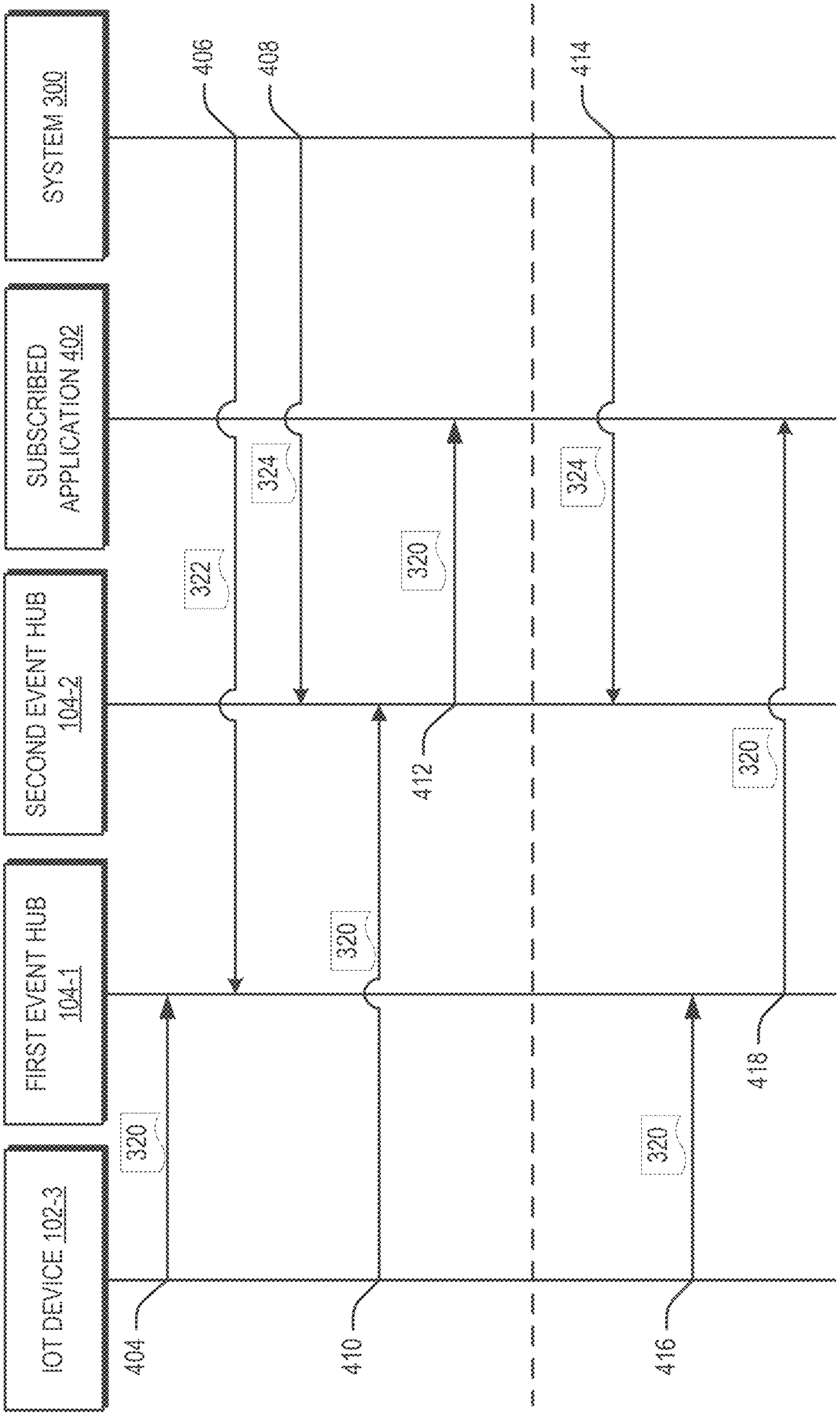
FIG. 4 illustrates a signal flow in a process to manage data in IoT systems, in accordance with an example implementation of the present subject matter.

FIG. 4 illustrates a signal flow diagram 400 depicting signal flow in a process to manage data in IoT systems, in accordance with an example implementation of the present subject matter.

As explained previously, in certain circumstances, any of the IoT devices 102-1, 102-2, 102-3, . . . , and 102-N coupled to an event hub may start generating telemetry data 320 above a predefined threshold due to various factors such as malfunctions, operational anomalies, faulty sensors, software errors, or interruptions in data transmission protocols. A system 300 may be implemented to manage this surge in volume of telemetry data 320. The system 300 may be similar to the above-explained system 108 in implementation and functionality.

The plurality of IoT devices 102-1, 102-2, 102-3, . . . , and 102-N are connected in a network environment 100, each configured to perform functions within the network environment 100. In an example embodiment, each of the plurality of IoT devices 102-1, 102-2, 102-3, . . . , and 102-N may be providing telemetry data 320 to one or more subscribed applications 402. For the sake of simplicity of depiction, only one IoT device 102-3, has been shown in FIG. 4.

In an example embodiment, the plurality of IoT devices 102-1, 102-2, 102-3, . . . , and 102-N are connected to a first event hub 104-1 among the plurality of event hubs 104-1, 104-2, . . . , 104-N of the IoT system. Each of the event hub 104-1, 104-2, . . . , 104-N within the plurality of event hubs 104-1, 104-2, . . . , 104-N may comprise a plurality of partitions, wherein the first event hub 104-1 comprises partitions 110-1, 110-2, 110-3, . . . , and 110-N, such that IoT device 102-1 may be mapped to partition 110-1, IoT device 102-2 may be mapped to partition 110-2, and IoT device 102-3 may be mapped to partition 110-3 and so on.

In an example implementation, the system 300 monitors the rate of telemetry data 320 received at the respective partitions of the first event hub 104-1 from the plurality of IoT devices 102-1, 102-2, 102-3, . . . , and 102-N. During standard operations, as illustrated in FIG. 4, at step 404, a normal data transmission process of telemetry data 320 from the IoT device 102-3 to the first event hub 104-1 occurs. Based on the ongoing monitoring, when the system 300 identifies that IoT device 102-3 is rendered rogue in that it has started generating telemetry data 320 at a rate exceeding the predefined threshold, the system 300 may trigger a series of actions to maintain system stability. Such identification of the rogue or malfunctioning IoT device 102-3 may involve continuous monitoring of rate of telemetry data 320 received at respective partitions of the first event hub 104—land their comparison against predefined threshold.

In an example implementation, upon identification, the system 300 may initiate a configuration process, to redirect the telemetry data 320 of the rogue IoT device 102-3 from the first event hub 104-1 to the second event hub 104-2. The second event hub 104-2, as mentioned previously, may be a redundant event hub with processing resources to handle data flow from the identified IoT device 102-3. Accordingly, at step 406, configuration data 322 to alter device twin settings of the identified IoT device 102-3 at the first event hub 104-1, may be pushed to the first event hub 104-1. The configuration data 322 changes the device twin settings of the identified IoT device 102-3 to redirect the telemetry data 320 of the identified IoT device 102-3 from the first event hub 104-1 to the second event hub 104-2. The device twin settings comprise a digital representation of an IoT device at an event hub to which the IoT device is mapped for providing telemetry data 320. Said settings may be used to configure routing of telemetry data 320 from the IoT device as explained previously.

Further to redirecting the telemetry data 320 of the identified IoT device 102-3 from the first event hub 104-1 to the second event hub 104-2, the system 300 calculates a throttling rate to be applied on the telemetry data 320 of the identified IoT device 102-3 incoming at the second event hub 104-2 when transmitting it to the one or more applications 402 subscribed to receive the telemetry data 320. In an example, the calculation of the throttling rate by the system 300 may take into account various factors such as the current system load, the processing capabilities of the subscribed applications, and the nature of the data being transmitted. In an example, once the throttling rate is calculated, a device rate data 324 comprising the calculated throttling rate is communicated to the second event hub 104-2 at step 408.

In an example, once the configuration of the identified IoT device 102-3 is modified, the IoT device 102-3 starts to provide telemetry data 320 to the second event hub 104-2, as indicated by step 410. While the identified IoT device 102-3 continues to malfunction and may provide telemetry data 320 to the second event hub 104-2 at higher than usual rate, the transmission of data from the second event hub 104-2 to the subscribed applications is carried out at the specified throttling rate, as indicated by step 412, to ensure that downstream applications can continue to function effectively, processing the data at a manageable rate without being overwhelmed by sudden surges.

In an example implementation, together with taking actions to throttle the high rate of incoming data from the IoT device 102-3 identified to be rogue, upon identification of such devices, the system may also alert one or more users to investigate and resolve issues corresponding to the identified IoT device. As efforts to resolve said issues are made, data from the IoT device 102-3 are received at the second event hub 104-2. In an example, the system 300 may monitor the second event hub 104-2 to determine when the rate of receipt of telemetry data 320 from the identified IoT device 102-3 returns below the predefined threshold. Once the rate of receipt of telemetry data 320 falls below a predefined threshold, as indicated by step 414, the system 300 may provide configuration data 322 for the IoT device 102-3 to the second event hub 104-2.

As will be understood based on the forgoing explanation, allows to reconfigure the device twin settings of the IoT device 102-3 at the second event hub 104-2, to redirect the telemetry data 320 of the IoT device 102-3 from the second event hub 104-2 again to the first event hub 104-1. As indicated in step 416, once the device twin settings of the identified IoT device 102-3 is modified, the IoT device 102-3 is reconfigured such that its telemetry data 320 is provided to the first event hub 104-1. Accordingly, the first event hub 104-1 resumes the task of providing the telemetry data 320 to the applications subscribed 402 to the telemetry data 320, as shown in step 418. By incorporating the alerting, monitoring, and reconfiguration capabilities, the system 300 provides for managing data flow anomalies in IoT systems, thereby mitigating the risk of overload scenarios that could lead to system failures, reduced performance, or other operational inefficiencies.

Figure 5:
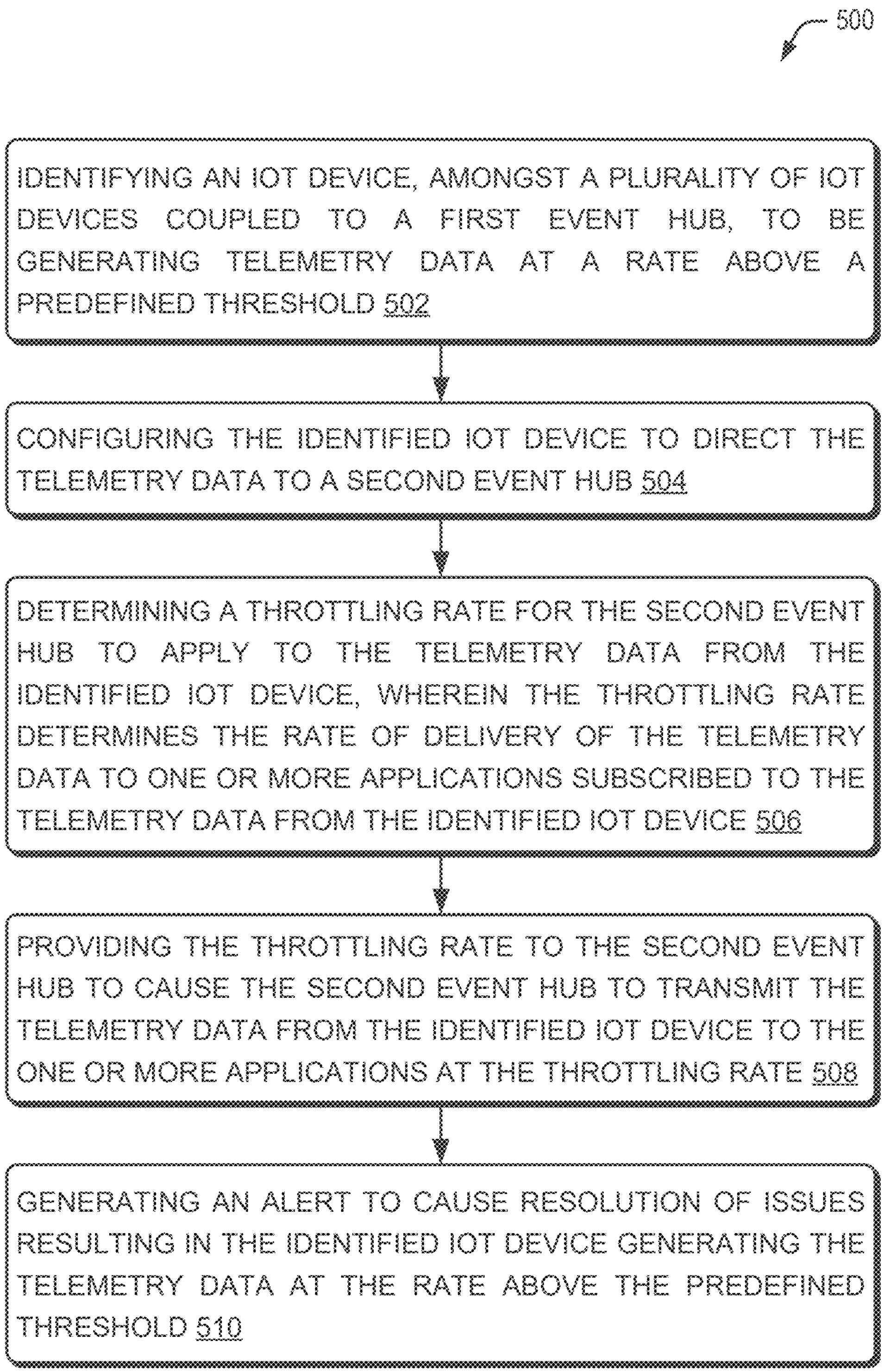
FIG. 5 illustrates a method for managing data in IoT systems, in accordance with an example implementation of the present subject matter.

FIG. 5 illustrates a method 500 for managing data in IoT systems, according to an example. Although the method 500 may be implemented in a variety of computer-based systems, for the ease of explanation, the present description of the example method 500 to manage data in IoT systems is provided in reference to the above-described system 300.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine readable instructions, or combination thereof.

It may be understood that blocks of the method 500 may be performed by programmed computing devices. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 5, at block 502, an IoT device, amongst a plurality of IoT devices 102-1, 102-2, 102-3, . . . , and 102-N coupled to a first event hub 104-1, to be generating telemetry data 320 at a rate above a predefined threshold is identified. As explained previously, an event hub 104 serves as a central point where telemetry data 320 from various IoT devices is ingested, temporarily stored, and transmitted to designated endpoints. In an example, these endpoints are one or more applications or services that are subscribed to receive the telemetry data 320. In an example, the telemetry data 320 may include various types of information collected by the plurality of IoT devices 102-1, 102-2, 102-3, . . . , and 102-N, such as sensor readings, device status, operational metrics, and other relevant data points that provide insights into the functioning and environment of the IoT devices.

In an example, the predefined threshold may refer to a predetermined limit or benchmark to indicate an acceptable rate of telemetry data 320 reception and processing at the first event hub 104-1. This threshold may be set by the IoT system's administrators or developers responsible for maintaining optimal performance and preventing overload in IoT systems. In an example, the predefined threshold may be based on factors such as the processing capacity of event hubs and the capacity of the subscribed applications.

At block 504, the identified IoT device is configured to direct the telemetry data 320 to a second event hub 104-2. In an example, the second event hub 104-2 may be a back-up device and is configured to process the telemetry data 320 from the identified IoT device generating telemetry data 320 above the predetermined threshold. As explained previously, in an example, configuring the identified IoT device to redirect its telemetry data 320 from the first IoT device 104-1 to the second event hub 104-2 may involve changing routing configurations of the identified IoT device to reflect the new destination, i.e., the second event hub 104-2.

At block 506, a throttling rate for the second event hub 104-2 is determined to apply to the telemetry data 320 from the identified IoT device. As explained previously, the throttling rate determines the rate of delivery of the telemetry data 320 to one or more applications that are subscribed to the telemetry data 320 of the identified IoT device. In an example, the throttling rate conforms to the processing capabilities of the one or more subscribed applications to prevent overloads in IoT system and ensure continuous operation.

At block 508, the calculated throttling rate is provided to the second event hub 104-2 to cause the second event hub 104-2 to transmit the telemetry data 320 from the identified IoT device to the one or more applications at the throttling rate. The second event hub 104-2 utilizes this throttling rate to regulate the transmission of telemetry data 320 to the applications subscribed to receive it.

At block 510, an alert to cause resolution of issues resulting in the identified IoT device generating the telemetry data 320 at the rate above the predefined threshold, is generated. As explained previously, this alert may provide information about the IoT device that is generating telemetry data 320 at the rate above the predefined threshold to one or more users, such as system administrators and field technicians who may investigate and resolve the issue. In an example, the alert may include details such as the IoT device identifier, the current data generation rate, the normal expected rate, and the time when the anomaly was detected.

In an example, the alert may also include suggestions for potential causes of the increased data generation, such as sensor malfunctions, software errors, or environmental factors. In an example, the alerts may be transmitted to the one or more users through various channels, such as email notifications, SMS messages, or dashboard notifications. For the purpose, in example embodiments, such contact information of the one or more users may be stored in the system 300.

The method 500 enhances IoT system performance by identifying IoT devices generating high volumes of telemetry data and redirecting their data to a secondary event hub to prevent overload, a throttling mechanism regulates the transmission rate to match the processing capacity of subscribed applications, ensuring efficient data handling and system stability, dynamic updates to configuration enable automated rerouting of telemetry data without manual intervention. Additionally, the method also provides for generating alerts to notify administrators of anomalies, enabling timely issue resolution and ensuring reliable and continuous operation in IoT systems.

Figure 6A:
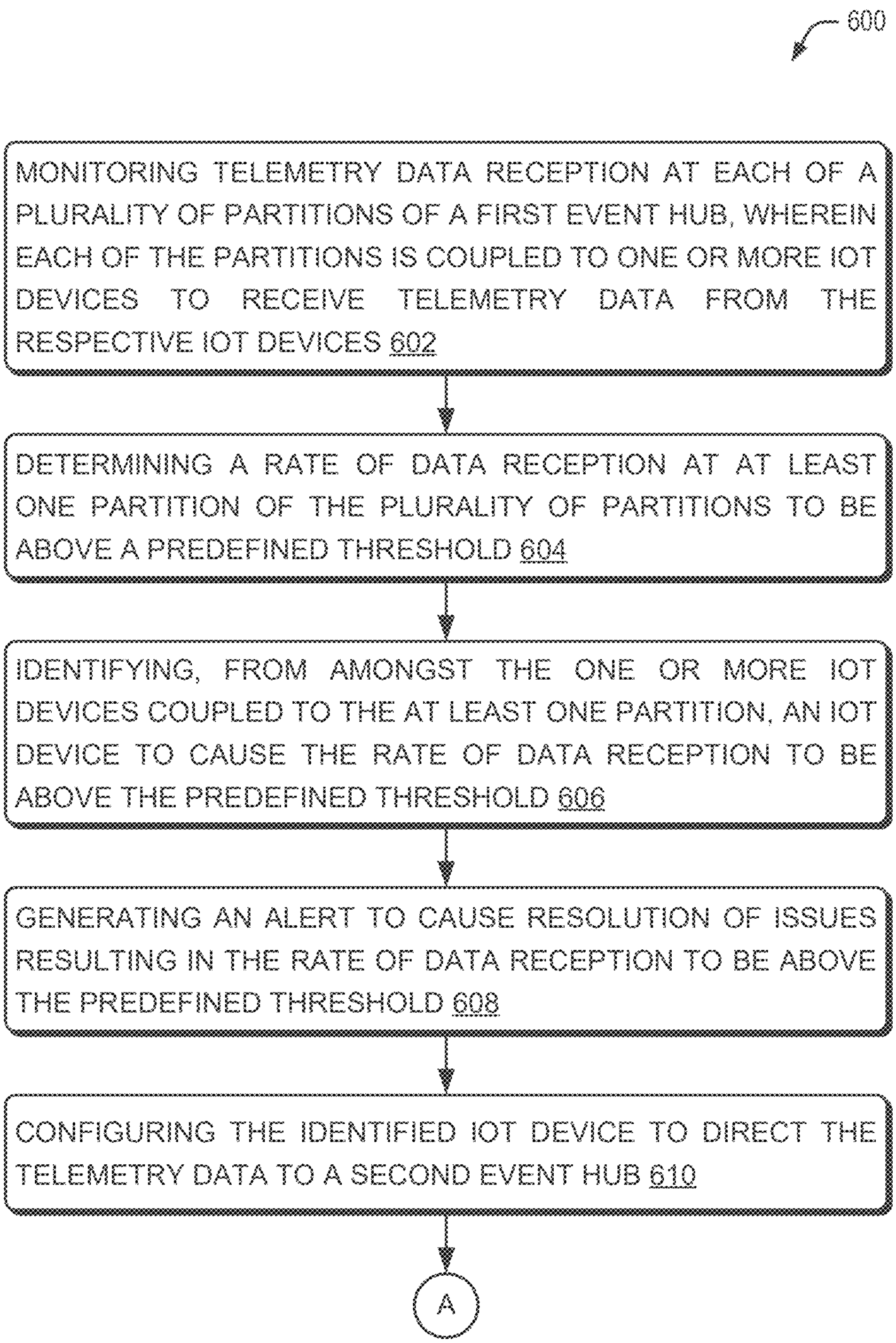
FIGS. 6A and 6B illustrate a detailed method for managing data in IoT systems, in accordance with example implementation of the present subject matter.
Figure 6B:
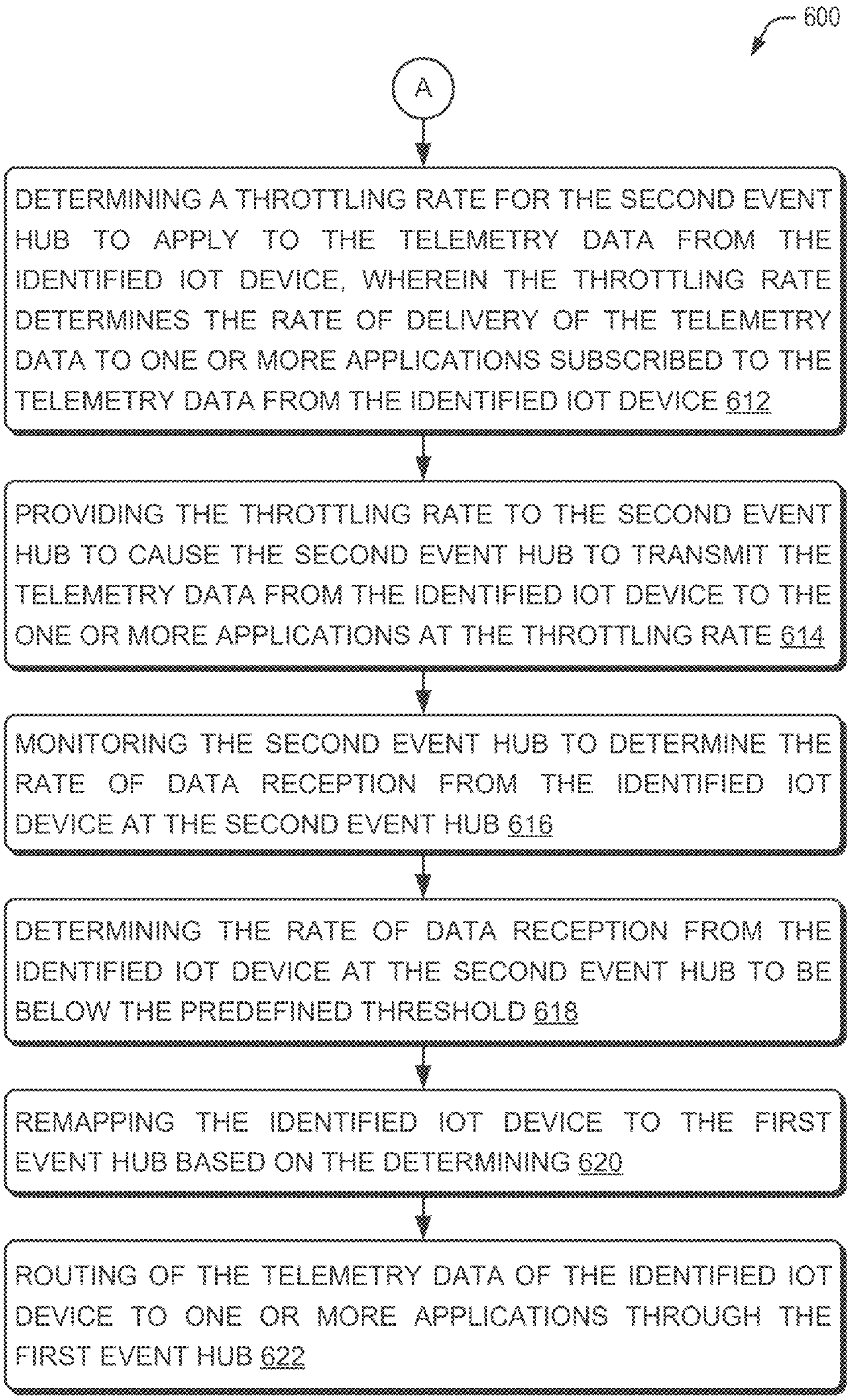

FIGS. 6A and 6B illustrate a method 600 for managing data in IoT systems, according to another example of the present subject matter. Although, the method 600 may be implemented in a variety of computer-based systems such as the system 300, as is the case with method 500, for the ease of explanation, the present description of the example method 600 to manage data in IoT systems is provided in reference to the above-described system 300.

The method 600 may be implemented by a processor(s) or computing device(s) through any suitable hardware, non-transitory machine-readable instructions, or combination thereof. It may be understood that blocks of the method 600 may be performed by programmed computing devices such as the system 300. The blocks of the method 600 may be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

The order in which the method 600 is described is not intended to be construed as a limitation, and any number of the described method blocks may be combined in any order to implement the method 600, or an alternative method.

At block 602, telemetry data 320 reception at each of a plurality of partitions 110-1, 110-2, 110-3, . . . , and 110-N of a first event hub 104-1 is monitored. As explained previously, each of the partitions among the plurality of partitions 110-1, 110-2, 110-3, . . . , and 110-N may be coupled to one or more IoT devices to receive telemetry data 320 from the respective IoT devices. As explained previously, each partition acts as a dedicated channel for receiving and processing telemetry data 320 from one or more specific IoT devices. In an example, the telemetry data 320 reception across all the plurality of partitions may be monitored within the first event hub 104-1.

In an example, the monitoring process may involves tracking various metrics for each partition, such as data volume, transmission frequency, and data patterns. This monitoring allows a detection of any anomalies or sudden increases in data transmission from specific IoT devices or groups of devices connected to particular partition among the plurality of partitions 110-1, 110-2, 110-3, . . . , and 110-N.

At block 604, a rate of data reception at at least one partition of the plurality of partitions 110-1, 110-2, 110-3, . . . , and 110-N is determined to be above a predefined threshold. The detection involves analyzing the data reception rate for each partition within the first event hub 104-1 to identify any partition experiencing an influx of telemetry data 320 that exceeds a predetermined threshold. As explained previously, the predefined threshold serves as a benchmark for acceptable data reception rates, typically set by system administrators based on factors such as the event hub's processing capacity, network bandwidth, and the expected data generation patterns of the connected IoT devices.

In an example, when the data reception rate for a particular partition surpasses this threshold, it indicates an anomaly in the data flow from one or more IoT devices connected to that partition. This could be due to various factors such as, but not limited to, device malfunctions, software errors, or unexpected conditions triggering increased data generation. Accordingly, at block 606, an IoT device from amongst the one or more IoT devices is identified to cause the rate of data reception to be above the predefined threshold. This involves pinpointing the specific IoT device responsible for the excessive data generation within the identified partition. Once a partition has been determined to be receiving data above the predefined threshold, a more granular analysis may be performed to isolate the individual device causing the anomaly. In an example, the identification may involve examining metadata associated with the incoming telemetry data 320, such as device identifiers, timestamps, and data types.

In an example, identifying an IoT device generating telemetry data 320 above a predetermined threshold may comprise investigating each partition among a plurality of partitions 110-1, 110-2, 110-3, . . . , and 110-N in the first event hub 104-1, each partition being configured to process incoming telemetry data 320 from one or more corresponding IoT devices among the plurality of IoT devices 102-1, 102-2, 102-3, . . . , and 102-N. By analyzing this information, the surge in data reception with a particular IoT device or a group of IoT devices may be correlated.

At block 608, an alert to cause resolution of issues resulting in the rate of data reception to be above the predefined threshold is generated. As explain previously, in step 510, this alert may provide information about the IoT device that is generating telemetry data 320 at the rate above the predefined threshold to one or more users who may be responsible for resolving the issue. In an example, the alert may include details such as the IoT device identifier, the current data generation rate, the normal expected rate, and the time when the anomaly was detected.

At block 610, the identified IoT device is configured to direct the telemetry data 320 to a second event hub 104-2. As explained previously, the second event hub 104-2 is configured to handle increased data flow from the identified IoT device 102-3. In an example, the device twin data 326 of the identified IoT device 102-3 may be accessed and modified to redirect the data from the first event hub 104-1 to the second event hub 104-2. In an example, the device twin data 326 may be stored in the first event hub 104-1. In an example, device twins are digital representations of physical devices.

At block 612, a throttling rate for the second event hub 104-2 to apply to the telemetry data 320 from the identified IoT device is determined. The throttling rate determines the rate of delivery of the telemetry data 320 to one or more applications subscribed to the telemetry data 320 from the identified IoT device. As explained previously, the throttling rate is calculated based on several factors to ensure optimal system performance and data integrity. In an example, the throttling rate may conform to the processing capabilities of the one or more subscribed applications to prevent overloads in IoT system and ensure continuous operation.

At block 614, the throttling rate is provided to the second event hub 104-2 to cause the second event hub 104-2 to transmit the telemetry data 320 from the identified IoT device to the one or more applications at the throttling rate. In example embodiments, as the second event hub 104-2 applies the throttling rate to regulate the transmission of telemetry data 320 to the applications subscribed to receive the telemetry data 320, further steps may be implemented to resume routing of the telemetry data 320 to the one or more applications through the first event hub 104-1. Such further steps may be implemented so that the IoT system may resume working as per its original configuration, wherein the first event hub 104-1 delivered the telemetry data 320 to the subscribed applications. For example, routing of the telemetry data 320 to the one or more applications through the first event hub 104-1 may resume when the identified IoT device no longer generates data at a rate greater than the predefined threshold as a result of measures that may have been implemented to control the excessive data generation from the identified IoT device.

Accordingly, at block 616, the second event hub 104-2 is monitored to determine the rate of data reception from the identified IoT device at the second event hub 104-2. Such monitoring may provide for determining if the rate of data reception from the identified device at the second event hub has reduced and is less than the predefined threshold. In an example, the monitoring of the second event hub 104-2 allows to determine whether the one or more users have effectively managed the data flow from the problematic device and issues underlying malfunctioning of the identified IoT device, that resulted in the rate of data reception to exceed the threshold, have been resolved.

In an example, the data reception rate at the second event hub 104-2 may be continuously monitored and comparing against the predefined threshold that was initially exceeded. At block 618, the rate of data reception from the identified IoT device at the second event hub 104-2 is determined to be below the predefined threshold. This determination may indicate that the measures implemented to control the excessive data generation from the identified IoT device have been effective and the underlying issue causing the surge in telemetry data 320 volume may have been resolved. This determination allows the IoT system to resume working as per its original configuration, wherein the first event hub 104-1 delivered the telemetry data 320 to the subscribed applications.

For managing data flow in IoT systems in accordance with the its original configuration, at block 620, based on the determination that the data reception rate has normalized, the identified IoT device is remapped to the first event hub 104-1. In an example, this remapping process involves reconfiguring the identified IoT device's device twin settings to direct its telemetry data 320 back to the first event hub 104-1, thereby restoring its primary data processing path.

At block 622, the telemetry data 320 of the identified IoT device is routed to one or more applications through the first event hub 104-1, indicating a return of the malfunctioning IoT device to normal operations. In an example, once the identified is reconfigured, the first event hub 104-1 resumes its role as the primary data ingestion and distribution point for this device's telemetry data 320. Thus, the one or more applications once again receive the telemetry data through their original pathways, ensuring continuity in data processing and analysis.

The method 600 provides several technical advantages in managing telemetry data 320 in IoT systems by efficiently handling scenarios where an IoT device generates data at a rate exceeding a predefined threshold. By identifying such devices and redistributing their telemetry data 320 to a secondary event hub, optimal performance of the primary event hub may be ensured. This reduces the risk of overloading and maintains uninterrupted data flow. The use of a throttling mechanism further enhances efficiency by aligning the data transmission rate with the processing capabilities of subscribed applications, preventing system bottlenecks and maintaining data integrity. Additionally, the method also provides for updating the device twin settings dynamically enables seamless rerouting of telemetry data without requiring manual intervention, thereby reducing operational complexity. Moreover, the generation of alerts to address anomalies ensures that system administrators are promptly informed of potential issues, such as sensor malfunctions or software errors, enabling swift resolution. This proactive approach enhances the reliability and resilience of the IoT system while supporting continuous operation and effective resource utilization.

Figure 7:
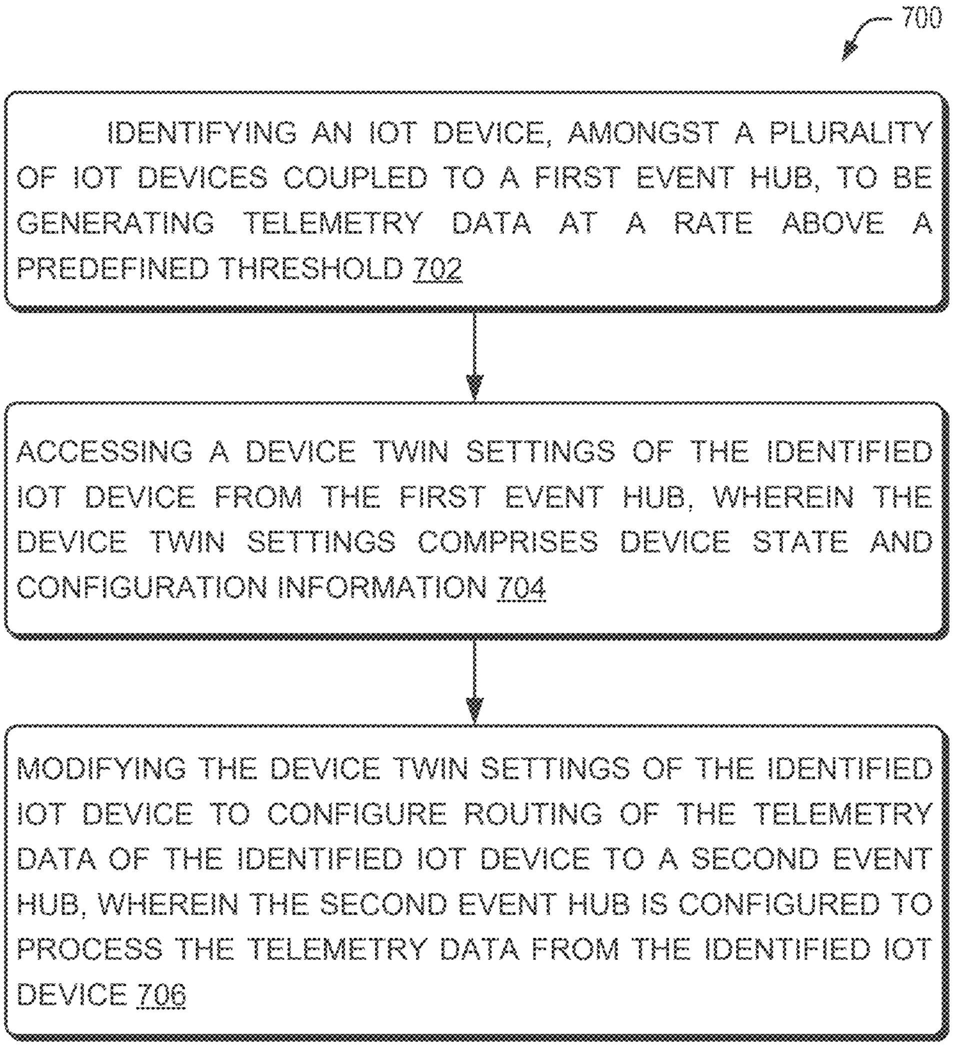
FIG. 7 illustrates a method of configuring an IoT device in IoT systems, in accordance with an example implementation of the present subject matter.

FIG. 7 illustrates a method 700 of configuring an IoT device in IoT systems, according to an example. In an embodiment, the method 700 for configuring an IoT device comprises steps that may, in any sequence or combination, be carried out to accomplish the function as described in block 504 and block 610 of the above-described method 500 and 600 respectively, for managing data in IoT systems.

Although the method 700 for configuring an IoT device may be performed by any computing system, for the ease of explanation, the method 700 is herein explained in reference to the system 300. Accordingly, in the examples provided in reference to method 700, the configuration module 312 of the system 300 may perform the steps of the method 700.

The order in which the method 700 is described is not intended to be construed as a limitation, and any number of the described method blocks may be combined in any order to implement the method 700, or an alternative method.

Referring to FIG. 7, at block 702, an IoT device amongst a plurality of IoT devices 102-1, 102-2, 102-3, . . . , and 102-N coupled to a first event hub 104-1, is identified to be generating telemetry data 320 at a rate above a predefined threshold. This step corresponds to the process previously described in steps 502 and 606 and is not reiterated here for the sake of conciseness.

At block 704, 'Device Twin' settings of the identified IoT device is accessed from the first event hub 104-1. The device twin settings comprise device state and configuration information of each of the IoT device coupled to the first event hub 104-1. As explained previously, device twins are digital representations of physical IoT devices that store information about each IoT device connected to the first event hub 104-1, such as device metadata, state information, configuration data, and connection details. By accessing the device twin settings, the information about the identified IoT device, such as its unique identifier, current configuration, and routing preferences may be retrieved. This information is indicative of the device's current state and can be used for managing its data flow.

At block 706, device twin settings of identified IoT device is modified to configure routing of the telemetry data 320 of the identified IoT device to a second event hub 104-2 from the first event hub 104-1. The second event hub 104-2 is configured to process the telemetry data 320 from the identified IoT device. In an example, the modification of the twin device settings may include updating the connection string or endpoint information in the device twin document to reflect the new destination, i.e., second event hub 104-2 for the device's telemetry data 320.

In an example, the modification enables the IoT system to dynamically redirect the telemetry data 320 from the identified device to the second event hub 104-2. By remapping the data routing, the excessive data flow may be managed effectively without requiring physical access to the device or disrupting its operation. This approach provides a flexible and scalable solution for handling anomalies in data generation within the IoT systems.

Figure 8:
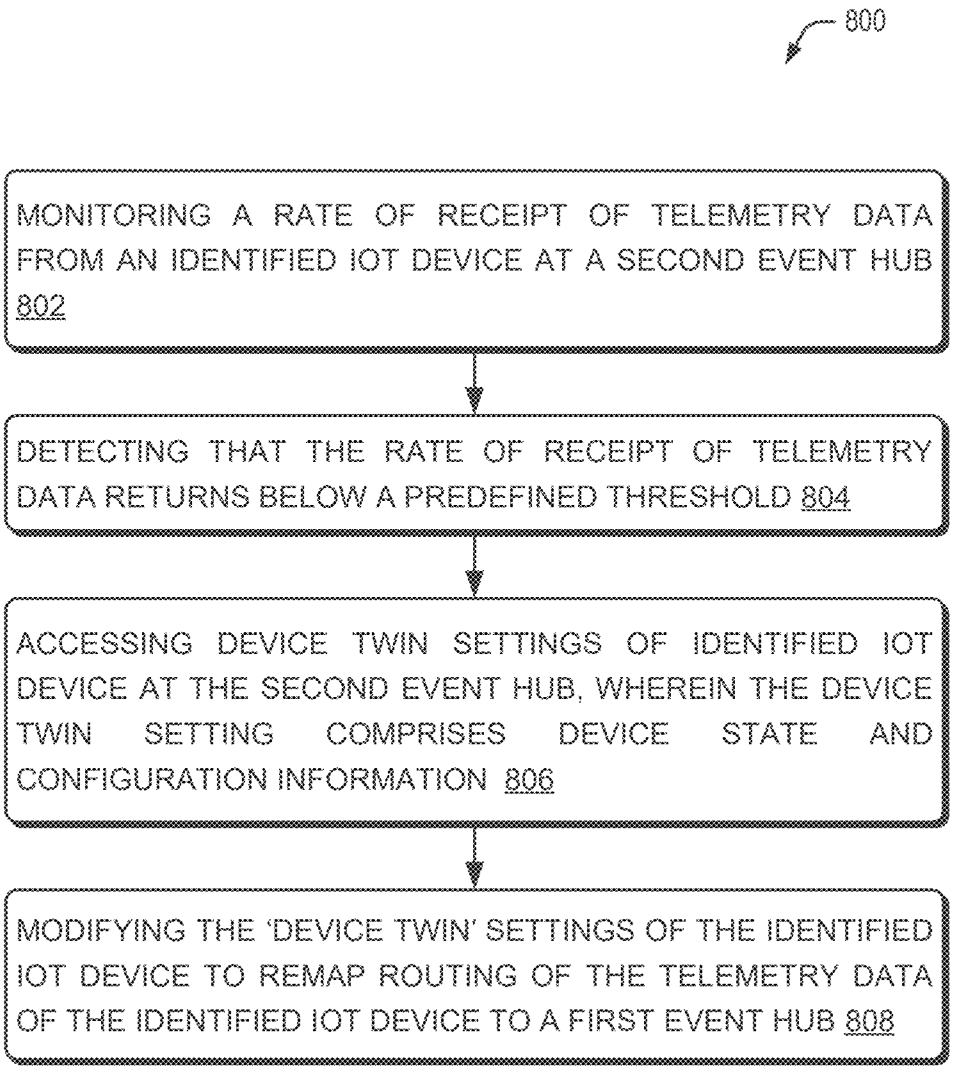
FIG. 8 illustrates a method of reconfiguring an IoT device in IoT systems, in accordance with an example implementation of the present subject matter.

FIG. 8 illustrates a method 800 of re-configuring the identified IoT device of method 700, according to an example. In an embodiment, the method 800 for configuring an IoT device comprises steps that may, in any sequence or combination, be carried out to accomplish the function as described in block 620 of the above-described method 600 respectively, for managing data in IoT systems.

Although the method 800 for configuring an IoT device may be performed by any computing system, for the ease of explanation, the method 800 is herein explained in reference to the system 300. Accordingly, in the examples provided in reference to method 800, the configuration module 312 of the system 300 may perform the steps of the method 800.

Referring to FIG. 8, at block 802, a rate of receipt of telemetry data 320 from the identified IoT device at the second event hub 104-2 is monitored. As explained previously, in an example, the monitoring may involve assessing the data reception rate from the identified IoT device at second event hub's 104-2. As explained above in reference to step 706 of method 700, the identified IoT device was previously redirected to the second event hub 104-2 due to exceeding the predefined threshold. In an example, the monitoring of the second event hub 104-2 is to determine whether the one or more users have effectively managed the data flow from the problematic device, and that the telemetry data 320 reception rate has returned to normal levels, i.e., below the predefined threshold.

At block 804, the rate of receipt of telemetry data 320 returns below a predefined threshold is detected. As explained previously in block 616, this detection may involve ongoing monitoring of the second event hub 104-2 to assess the data reception rate from the identified IoT device that was previously redirected due to exceeding the predefined threshold.

At block 806, a device twin setting of the identified IoT device is accessed from the second event hub 104-2 and at block 808, the device twin setting of the identified IoT device is modified to remap routing of the telemetry data 320 of the identified IoT device to the first event hub 104-1 from the second event hub 104-2. As explained previously, the device twin setting comprises device state and configuration information of the identified IoT device. Once the identified IoT device's device twin setting is accessed, modifications may be made to reconfigure the routing of the telemetry data 320 back to the first event hub 104-1. The changes allow the first event hub 104-1 to resume its role as the primary data ingestion and distribution point for this device's telemetry data 320.

The methods 700 and 800 may provide several advantages in managing IoT devices within complex systems. By utilizing device twin settings, the method allows for dynamic reconfiguration of data routing without requiring physical access to the devices. Additionally, by leveraging digital representations of physical devices, the method may offer a more robust and centralized way to manage device configurations, which may lead to improved system reliability and easier troubleshooting in IoT environments.

Figure 9:
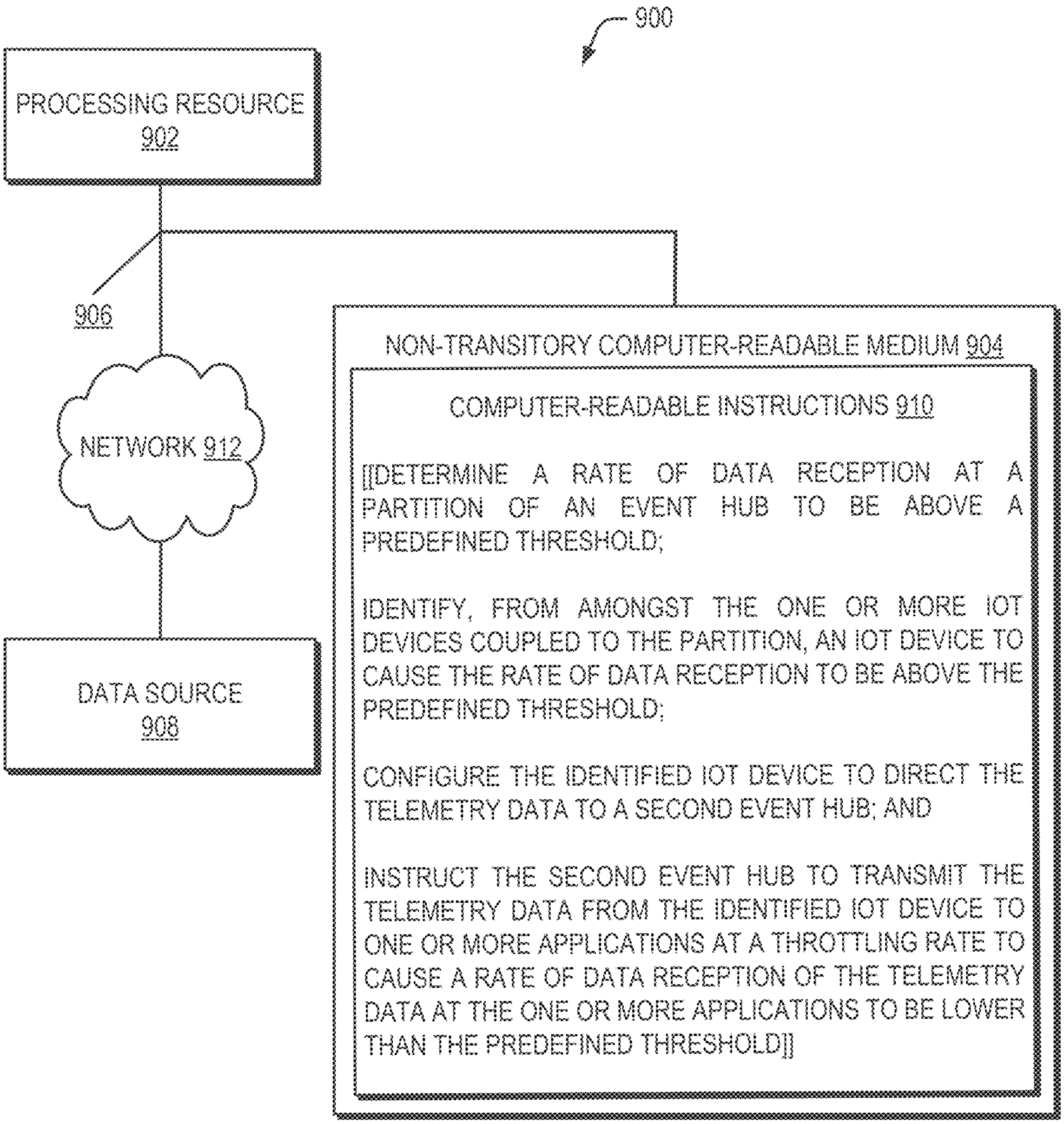
FIG. 9 illustrates a computer environment for managing data in IoT systems, in accordance with an example implementation of the present subject matter.

FIG. 9 illustrates a computing environment 900 for managing data in IoT systems, according to an example. In an example implementation, the computing environment 900 may comprise a computing device, such as the above-described system 300. The computing environment 900 includes a processing resource 904 communicatively coupled to the non-transitory computer-readable medium 902 through a communication link 906. In an example, the processing resource 904 may be a processor of the computing device, such as the processor 202 of the system 300, that fetches and executes computer-readable instructions from the non-transitory computer-readable medium 902.

The non-transitory computer-readable medium 902 can be, for example, an internal memory device or an external memory device. In an example implementation, the communication link 906 may be a direct communication link, such as any memory read/write interface. In another example implementation, the communication link 906 may be an indirect communication link, such as a network interface. In such a case, the processing resource 904 can access the non-transitory computer-readable medium 902 through a network 908. The network 908 may be a single network or a combination of multiple networks and may use a variety of different communication protocols.

The processing resource 904 and the non-transitory computer-readable medium 902 may also be communicatively coupled to data sources 910. In an example implementation, the non-transitory computer-readable medium 902 comprises executable instructions 912 for managing data in IoT systems.

In an example, the instructions 912 cause the processing resource 904 to monitor telemetry data 320 reception at each of a plurality of partitions 110-1, 110-2, 110-3, . . . , and 110-N of a first event hub 104-1. In an example, each of the partitions is coupled to one or more IoT devices to receive telemetry data 320 from the respective IoT devices. In an example, the telemetry data 320 may include various types of information collected by the plurality of IoT devices 102-1, 102-2, 102-3, . . . , and 102-N, such as sensor readings, device status, operational metrics, and other relevant data points that provide insights into the functioning and environment of the IoT devices.

In an example, the monitoring comprises continuous or intermittent observation and analysis of the incoming telemetry data 320 streams across all the plurality of partitions 110-1, 110-2, 110-3, . . . , and 110-N within the first event hub 104-1. In an example, the each of the partition serve as logical divisions within the event hub, each dedicated to handling data from specific IoT devices or groups of devices. By monitoring the telemetry data 320 reception, potential issues such as data surges, transmission irregularities, or device malfunctions may be identified.

In an example, the instructions 912 cause the processing resource 904 to determine a rate of data reception at at least one partition of the plurality of partitions 110-1, 110-2, 110-3, . . . , and 110-N to be above a predefined threshold. The instructions may be executable by the processing resource 904 to analyse the data reception rate for each partition within the first event hub 104-1 and identify any partition experiencing an influx of telemetry data 320 that exceeds a predetermined threshold. As explained previously, the predefined threshold serves as a benchmark for acceptable data reception rates, typically set by system administrators based on factors such as the event hub's processing capacity, network bandwidth, and the expected data generation patterns of the connected IoT devices.

In an example, the instructions may be executable to perform real-time comparison of incoming data rates against the established threshold, utilizing metrics such as messages per second or data volume over a specific time interval. In an example, advanced implementations may employ statistical analysis or machine learning algorithms to be executed to detect subtle deviations from normal data reception patterns, enabling early intervention before critical thresholds are breached. When the data reception rate for a particular partition surpasses this threshold, it indicates an anomaly in the data flow from one or more IoT devices connected to that partition. This could be due to various factors such as device malfunctions, software errors, or unexpected environmental conditions triggering increased data generation.

In an example, the rate of data reception at the at least one partition is determined to be above the predetermined threshold by calculating the average rate of data reception for each of the plurality of partitions 110-1, 110-2, 110-3, . . . , and, 110-N at the first event hub 104-1 over multiple time intervals. Identifying partitions with above-threshold data reception rates allows for prompt identification of potential issues that could lead to system overload or degraded performance if left unaddressed.

In an example, the instructions 912 cause the processing resource 904 to identify, from amongst the one or more IoT devices coupled to the at least one partition, an IoT device to cause the rate of data reception to be above the predefined threshold. In an example, the instructions may be executable by the processing resource 904 to pinpoint the specific IoT device responsible for the excessive data generation within the identified partition by investigating the partition that has been determined to be receiving telemetry data 320 above the predefined threshold. In an example, the instructions may be executable by the processing resource 904 to examine metadata associated with the incoming telemetry data 320, such as device identifiers, timestamps, and data types. By analyzing this information, surge in data reception with a particular IoT device or a small group of devices may be corelated.

In an example, the instructions 912 cause the processing resource 904 to configure the identified IoT device to direct the telemetry data 320 to a second event hub 104-2 that may be configured to handle and process the higher volume or rate of data coming from the identified device. As explained previously, the device twin data of the identified IoT device may be modified to configure the identified IoT device to direct the data from the first event hub 104-1 to the second event hub 104-2. In an example, the device twin data of the identified device corresponds to a digital representation of the identified device that may be stored in the first event hub 104-1 and may be altered to cause the identified device to direct the data from the first event hub 104-1 to the second event hub 104-2.

In an example, the instructions 912 further cause the processing resource 904 to instruct the second event hub 104-2 to transmit the telemetry data 320 from the identified IoT device to one or more applications at a throttling rate to cause a rate of data reception of the telemetry data 320, from the identified IoT device, at the one or more applications to be lower than the predefined threshold. As explained previously, the throttling rate determines a rate of delivery of telemetry data 320 to the one or more applications in accordance with processing capabilities of the one or more applications. The throttling rate may be adjusted dynamically to optimize data flow, ensuring that one or more subscribed applications receive a manageable stream of telemetry data 320 without compromising their performance or the overall integrity of the IoT system.

Thus, the methods and systems of the present subject matter provide for managing data in IoT systems. Although implementations of managing building data in IoT systems have been described in a language specific to structural features and/or methods, it is to be understood that the appended claims are not necessarily limited to the specific features or methods described. Rather, the specific features and methods are disclosed as example implementations of managing data in IoT systems.

The invention claimed is:

1. A system to manage data in Internet of Things (IoT) systems, the system comprising:

at least one processor to:

determine a rate of receipt of telemetry data at a first event hub, wherein the first event hub is to receive the telemetry data from a plurality of IoT devices and provide the telemetry data to one or more applications subscribed to the telemetry data;

identify, based on the determination, an IoT device among the plurality of IoT devices generating telemetry data at a rate above a predefined threshold;

configure the identified IoT device to direct the telemetry data to a second event hub, wherein the second event hub is configured to process the telemetry data from the identified IoT device;

determine a throttling rate for the second event hub to apply to the telemetry data from the identified IoT device, wherein the throttling rate determines a rate of delivery of telemetry data to the one or more applications; and cause the second event hub to transmit the telemetry data from the identified IoT device to the one or more applications at the throttling rate.

2. The system of claim 1, wherein the throttling rate conforms to processing capabilities of the one or more applications subscribed to the telemetry data.

3. The system of claim 1, wherein the system is further configured to generate an alert directed to one or more users to investigate and resolve issues corresponding to the identified IoT device resulting in the identified IoT device generating telemetry data at the rate above the predefined threshold.

4. The system of claim 1, wherein the system is further configured to remap the routing of the telemetry data of the identified IoT device to the first event hub once the rate of receipt of telemetry data from the identified IoT device returns below the predefined threshold.

5. The system of claim 4, wherein the system is further configured to monitor the second event hub to determine when the rate of receipt of telemetry data from the identified IoT device returns below the predefined threshold.

6. The system of claim 1, wherein to configure the identified IoT device the processor is to:

access a device twin setting associated with the identified IoT device at the first event hub, wherein the device twin setting comprises a digital representation of the identified IoT device including device state and configuration information; and modify the device twin setting to update routing information for the identified IoT device, wherein the modified routing information directs the telemetry data to the second event hub.

7. The system of claim 1, wherein the rate of receipt of telemetry data is determined by calculating an average rate of receipt of telemetry data from each of the plurality of IoT devices at the first event hub over multiple time intervals.

8. The system of claim 1, wherein identifying the IoT device generating telemetry data at the rate above the predefined threshold comprises investigating each partition among a plurality of partitions in the first event hub, each partition being configured to process incoming telemetry data from one or more corresponding IoT devices among the plurality of IoT devices.

9. A method to manage data in Internet of Things (IoT) systems, comprising:

identifying an IoT device, amongst a plurality of IoT devices coupled to a first event hub, to be generating telemetry data at a rate above a predefined threshold;

configuring the identified IoT device to direct the telemetry data to a second event hub;

determining a throttling rate for the second event hub to apply to the telemetry data from the identified IoT device, wherein the throttling rate determines the rate of delivery of the telemetry data to one or more applications subscribed to the telemetry data from the identified IoT device;

providing the throttling rate to the second event hub to cause the second event hub to transmit the telemetry data from the identified IoT device to the one or more applications at the throttling rate; and generating an alert to cause resolution of issues resulting in the identified IoT device generating the telemetry data at the rate above the predefined threshold.

10. The method of claim 9, wherein the throttling rate conforms to the processing capabilities of the one or more applications subscribed to the telemetry data from the identified IoT device.

11. The method of claim 9, further comprising remapping the routing of the telemetry data of the identified IoT device to the first event hub once the rate of receipt of telemetry data from the identified IoT device returns below the predefined threshold.

12. The method of claim 11, further comprising monitoring the second event hub to determine when the rate of receipt of telemetry data from the identified IoT device returns below the predefined threshold.

13. The method of claim 9, wherein identifying the IoT device generating telemetry data at the rate above the predefined threshold comprises investigating each partition among a plurality of partitions in the first event hub, each partition being configured to process incoming telemetry data from one or more corresponding IoT devices among the plurality of IoT devices.

14. The method of claim 9, wherein configuring the identified IoT device to direct the telemetry data comprises:

accessing, at the first event hub, a device twin setting associated with the identified IoT device, wherein the device twin setting comprises a digital representation of the identified IoT device including device state information and configuration settings; and modifying the device twin setting to update routing information for the identified IoT device, wherein the modified routing information directs the telemetry data to a second event hub.

15. A non-transitory medium comprising instructions executable by processing resource to:

monitor telemetry data reception at each of a plurality of partitions of a first event hub, wherein each of the partitions is coupled to one or more IoT devices to receive telemetry data from the respective IoT devices;

determine a rate of data reception at at least one partition of the plurality of partitions to be above a predefined threshold;

identify, from amongst the one or more IoT devices coupled to the at least one partition, an IoT device to cause the rate of data reception to be above the predefined threshold;

configure the identified IoT device to direct the telemetry data to a second event hub; and instruct the second event hub to transmit the telemetry data from the identified IoT device to one or more applications at a throttling rate to cause a rate of data reception of the telemetry data, from the identified IoT device, at the one or more applications to be lower than the predefined threshold.

16. The non-transitory computer-readable medium of claim 15, wherein the throttling rate conforms to processing capabilities of the one or more applications subscribed to the telemetry data.

17. The non-transitory computer-readable medium of claim 15, further comprising instructions executable by the processing resource to generate an alert directed to one or more users to investigate and resolve issues corresponding to the identified IoT device resulting in the data reception to be above the predefined threshold.

18. The non-transitory computer-readable medium of claim 15 further comprising instructions executable by the processing resource to remap the routing of telemetry data from the identified IoT device to the first event hub once a rate of telemetry data transmission from the identified IoT device returns below the predefined threshold.

19. The non-transitory computer-readable medium of claim 18, further comprising instructions executable by the processing resource to monitor the second event hub to detect when the rate of telemetry data transmission from the identified IoT device drops below the predefined threshold.

20. The non-transitory computer-readable medium of claim 15, wherein the rate of data reception at the at least one partition is determined to be above a predetermined threshold by calculating the average rate of data reception for each of the plurality of partitions at the first event hub over multiple time intervals.

* * * * *